US009047633B2

(12) United States Patent
Gershon et al.

(10) Patent No.: US 9,047,633 B2
(45) Date of Patent: Jun. 2, 2015

(54) SYSTEM AND METHOD FOR IDENTIFYING, SEARCHING AND MATCHING PRODUCTS BASED ON COLOR

(71) Applicant: ZENCOLOR CORPORATION, Coral Gables, FL (US)

(72) Inventors: Dann Gershon, Coral Gables, FL (US); David Robinson, Jersey City, NJ (US); Jonathan Wilder, Miami, FL (US)

(73) Assignee: ZENCOLOR CORPORATION, Coral Gables, FL (US)

( * ) Notice: Subject to any disclaimer, the term of this patent is extended or adjusted under 35 U.S.C. 154(b) by 104 days.

(21) Appl. No.: 14/055,844

(22) Filed: Oct. 16, 2013

(65) Prior Publication Data
US 2014/0052584 A1 Feb. 20, 2014

Related U.S. Application Data

(63) Continuation-in-part of application No. 13/762,160, filed on Feb. 7, 2013, and a continuation-in-part of application No. PCT/US2013/025135, filed on Feb. 7, 2013, and a continuation-in-part of application No.
(Continued)

(51) Int. Cl.
*G06Q 30/06* (2012.01)
*G09G 5/06* (2006.01)
*G06F 17/30* (2006.01)
*G09G 5/02* (2006.01)

(52) U.S. Cl.
CPC ........ *G06Q 30/0627* (2013.01); *G06F 17/3025* (2013.01); *G09G 5/022* (2013.01); *G06Q 30/0639* (2013.01); *G09G 5/06* (2013.01); *G09G 2370/022* (2013.01)

(58) Field of Classification Search
None
See application file for complete search history.

(56) References Cited

U.S. PATENT DOCUMENTS

| 3,652,092 | A  | 3/1972 | Boyer et al. |
|-----------|-----|--------|---------------|
| 5,668,633 | A  | 9/1997 | Chetam et al. |
| 6,349,300 | B1 | 2/2002 | Graf et al. |
| 6,563,510 | B1 | 5/2003 | Rice et al. |
| 6,594,386 | B1 | 7/2003 | Golshani et al. |

(Continued)

FOREIGN PATENT DOCUMENTS

| JP | 2000-348050 A | 12/2000 |
| JP | 2002-180318 A | 6/2002 |

(Continued)

*Primary Examiner* — Bernard Krasnic
(74) *Attorney, Agent, or Firm* — IM IP Law PLLC; C. Andrew Im

(57) ABSTRACT

A system and method for searching and matching products based on color using a universal color system comprises a plurality of processor based client devices, each client device uniquely associated with a user, a database engine comprising a plurality of products reverse mapped and organized in accordance with the hexadecimal color codes of the universal color system, and a processor based server. The server receives a color-based search query comprising user's color selection from a client device associated with a user over a communications network. The user's color selection comprises at least one hexadecimal color code of the universal color system. A color engine of the server searches the database engine for products having the hexadecimal color codes with a predetermined range of the hexadecimal color code of the user's color selection, and transmits the search result to the client device associated with the user over the communications network.

33 Claims, 13 Drawing Sheets

Related U.S. Application Data

13/762,281, filed on Feb. 7, 2013, and a continuation-in-part of application No. PCT/US2013/025200, filed on Feb. 7, 2013, and a continuation-in-part of application No. 13/857,685, filed on Apr. 5, 2013, and a continuation-in-part of application No. PCT/US2013/035495, filed on Apr. 5, 2013, and a continuation-in-part of application No. 13/910,557, filed on Jun. 5, 2013, now Pat. No. 8,600,153, and a continuation-in-part of application No. PCT/US2013/044317, filed on Jun. 5, 2013, said application No. 13/910,557 is a continuation-in-part of application No. PCT/US2013/025200, and a continuation-in-part of application No. PCT/US2013/035495, which is a continuation-in-part of application No. 13/762,281, and a continuation-in-part of application No. 13/762,160, said application No. 13/910,557 is a continuation-in-part of application No. 13/857,685, which is a continuation-in-part of application No. 13/762,160, and a continuation-in-part of application No. 13/762,281, said application No. 13/910,557 is a continuation-in-part of application No. PCT/US2013/025135, and a continuation-in-part of application No. 13/762,160, said application No. 13/910,557 is a continuation-in-part of application No. 13/762,281.

(60) Provisional application No. 61/595,887, filed on Feb. 7, 2012, provisional application No. 61/656,206, filed on Jun. 6, 2012, provisional application No. 61/679,973, filed on Aug. 6, 2012, provisional application No. 61/792,401, filed on Mar. 15, 2013.

(56) References Cited

U.S. PATENT DOCUMENTS

| | | |
|---|---|---|
| 6,924,817 B2 | 8/2005 | Rice et al. |
| 7,187,386 B2 | 3/2007 | Rice et al. |
| 7,561,735 B2 | 7/2009 | Levin et al. |
| 7,689,544 B2 | 3/2010 | Koenig |
| 7,711,610 B2 | 5/2010 | Iwaki et al. |
| 8,532,372 B2 † | 9/2013 | Youngman |
| 2001/0049636 A1 | 12/2001 | Hudda et al. |
| 2002/0069131 A1 | 6/2002 | Miyata et al. |
| 2002/0184171 A1 | 12/2002 | McClanahan |
| 2003/0174143 A1 | 9/2003 | Rice et al. |
| 2003/0231185 A1 | 12/2003 | Kupersmit |
| 2006/0001665 A1 | 1/2006 | Kupersmit |
| 2006/0210952 A1 | 9/2006 | Toland |
| 2006/0250623 A1 | 11/2006 | Newman et al. |
| 2007/0028178 A1 | 2/2007 | Gibson et al. |
| 2008/0046410 A1 | 2/2008 | Lieb |
| 2008/0075360 A1 | 3/2008 | Li et al. |
| 2008/0118146 A1 | 5/2008 | Cieplinski |
| 2008/0316513 A1 | 12/2008 | Yamazoe |
| 2009/0112862 A1 | 4/2009 | Mo |
| 2009/0281925 A1 | 11/2009 | Winter et al. |
| 2010/0020095 A1 | 1/2010 | Reynolds et al. |
| 2010/0110101 A1 | 5/2010 | Relyea et al. |
| 2010/0254600 A1 | 10/2010 | Kim |
| 2012/0203760 A1 | 8/2012 | Abraham et al. |
| 2013/0044944 A1 | 2/2013 | Wang et al. |
| 2013/0083999 A1 | 4/2013 | Bhardwaj et al. |

FOREIGN PATENT DOCUMENTS

| | | | |
|---|---|---|---|
| JP | 2003099629 | A | 4/2003 |
| JP | 2004-118444 | A | 4/2004 |
| JP | 2004312444 | A | 11/2004 |
| JP | 2004318445 | A | 11/2004 |
| KR | 10-2002-0004736 | A | 1/2002 |
| KR | 10-2002-0074528 | A | 10/2002 |
| KR | 10-2003-0029616 | A | 4/2003 |
| KR | 10-2008-0032890 | A | 4/2008 |
| KR | 20090094526 | A | 9/2009 |

† cited by third party

SYSTEM AND METHOD FOR IDENTIFYING, SEARCHING AND MATCHING PRODUCTS BASED ON COLOR

RELATED APPLICATIONS

The present application claims priority to U.S. Provisional Application No. 61/792,401 filed Mar. 15, 2013, which is incorporated herein by reference in its entirety.

The present application is a continuation-in-part application of U.S. application Ser. No. 13/762,160 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation-in-part application of PCT Application No. PCT/US13/25135 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation-in-part application of U.S. application Ser. No. 13/762,281 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation-in-part application of PCT Application No. PCT/US13/25200 filed Feb. 7, 2013, which claims priority to U.S. Provisional Application Nos. 61/595,887 filed on Feb. 7, 2012, 61/656,206 filed on Jun. 6, 2012, and 61/679,973 filed on Aug. 6, 2012, each of which is incorporated herein by reference in its entirety.

The present application is a continuation-in-part application of U.S. application Ser. No. 13/857,685 filed Apr. 5, 2013, which claims priority to U.S. Provisional Application Nos. 61/656,206 filed on Jun. 6, 2012, 61/679,973 filed on Aug. 6, 2012 and 61/792,401 filed Mar. 15, 2013 and which is a continuation-in-part application of U.S. application Ser. No. 13/762,160 filed Feb. 7, 2013 and a continuation-in-part application of U.S. application Ser. No. 13/762,281 filed Feb. 7, 2013, each of which is incorporated herein by reference in its entirety.

The present application is a continuation-in-part application of PCT/US13/35495 filed Ap. 5, 2013, which claims priority to U.S. Provisional Application Nos. 61/656,206 filed on Jun. 6, 2012, 61/679,973 filed on Aug. 6, 2012 and 61/792, 401 filed Mar. 15, 2013 and 61/792,401 filed Mar. 15, 2013, and which claims priority to U.S. application Ser. No. 13/762,160 filed Feb. 7, 2013 and U.S. application Ser. No. 13/762,281 filed Feb. 7, 2013, each of which is incorporated herein by reference in its entirety.

The present application is a continuation-in-part application of Ser. No. 13/910,557 filed Jun. 5, 2013, which claims priority to U.S. Provisional Application Nos. 61/656,206 filed on Jun. 6, 2012, 61/679,973 filed on Aug. 6, 2012 and 61/792, 401 filed Mar. 15, 2013, and which is continuation-in-part application of U.S. application Ser. No. 13/762,160 filed Feb. 7, 2013, U.S. application Ser. No. 13/762,281 filed Feb. 7, 2013, U.S. application Ser. No. 13/857,685 filed Apr. 5, 2013, PCT Application No. PCT/US13/25135 filed Feb. 7, 2013, PCT Application No. PCT/US1325200 filed Feb. 7, 2013 and PCT Application No. PCT/US13/35495 filed Apr. 5, 2013, each of which is incorporated herein by reference in its entirety.

The present application is a continuation-in-part application of PCT/US13/44317 filed Jun. 5, 2013, which claims priority to U.S. Provisional Application Nos. 61/656,206 filed on Jun. 6, 2012, 61/679,973 filed on Aug. 6, 2012 and 61/792, 401 filed Mar. 15, 2013, and which is a continuation-in-part application of U.S. application Ser. No. 13/762,160 filed Feb. 7, 2013, U.S. application Ser. No. 13/762,281 filed Feb. 7, 2013, U.S. application Ser. No. 13/857,685 filed Apr. 5, 2013, PCT Application No. PCT/US13/25135 filed Feb. 7, 2013, PCT Application No. PCT/US1325200 filed Feb. 7, 2013 and PCT Application No. PCT/US13/35495 filed Apr. 5, 2013, each of which is incorporated herein by reference in its entirety.

FIELD OF THE INVENTION

The claimed invention relates to a system and method for identifying, searching and matching products based on color, more particularly, a system and method for identifying, searching and matching based on a universal color system.

BACKGROUND OF THE INVENTION

At times, a user will want to search for a product by color even though it is an attribute that cannot be described adequately using words. For example, other than using rudimentary color names, such as "red" and "blue," searching for products of a particular shade using color as a parameter is extremely difficult, even when the color is relatively popular and intuitively should be easy to locate. For example, there are numerous colors which would fit the simple "red" or "blue" description, and searching using the textual word "red" is not likely to bring up the specific red or the specific product of interest. Also, searches based on a particular type of color by name, such as "rose red" or "ocean blue" are unlikely to turn up the color of interest, as there may be a number of different colors, each with a different name or with multiple names varying by the naming convention used. Similarly, searching for a pattern made of colors, such as "blue and red stripes" is unlikely to turn up the desired pattern of particular colors.

Many of the drawbacks involving color-based searching stem from the nature of internet searching, which has historically been text-based, thus requiring a user to enter text into a search engine to describe the information sought. With regard to color, textual color names are typically tagged or embedded beneath an image of a product or associated webpage as metadata, making it virtually impossible to obtain reliable and complete search results when specific color shades are sought. More specifically, because many search systems that implement searching based on a color (or a pattern) are operable only as text searching, a system may allow a user to select a color by name or even "click" on the color (in the form of a color swatch) and then search for the selected color. However, in these instances, the system typically converts the inputted search parameter to a text-string associated with or representing a particular color. For example, a search system may search based on clicking red swatch on a webpage but converts the click to a search for "red" as text, but not as an actual color.

In such a system, the name of the color "red" is "tagged" to an image by way of a text string and the search is based by matching the input "red" to the text string "red" on the tag, and not to the color. From a consumer's perspective, such a system is insufficient to reliably capture all relevant products of a particular shade of red that are being sought. From a merchant perspective, such a system does not allow for dynamic analysis or codification of color that is a crucial but missing data set in understanding consumer preferences.

Another problem with contemporary color searching is a lack of universal color codification and unifying color-naming conventions. For example, even when a search using a specific color such as "cherry red" yields some relevant results when utilizing a search engine or a search field on a particular merchant's website (i.e., where the merchant utilizes the term "cherry red" as a tag to identify some of its products), such searches do not yield all of the relevant results for the particular type of red being searched. This is the case even when there are available products sold by other merchants that have the identical color or a close equivalent color but which use a term other than "cherry red" to identify that color.

Even color systems that offer naming conventions suffer from underlying drawbacks in their inconsistent application by merchant users and their vendors. For example, a wholesale buyer for a retailer may decide to order a line of products from a vendor in a color that is identified as "cobalt blue." A second wholesale buyer at the same retailer may order another line of products from a second vendor in a color that the second buyer also identifies "cobalt blue," having the intention that the colors be precisely the same so that a purchaser of product from the first line will be more inclined to purchase the second line of product as a matching set. Indeed, the variation in color between two products that purportedly have the 'same color' can be remarkable when the products are placed side by side. The lack of consistency among vendors and suppliers, even when the same color names are utilized, is often not appreciated until after the products arrive, at which time it is too late to ameliorate the situation.

Direct searching based on a particular color or a swatch has not been effectively accomplished. For example, if a user is in possession of one article of clothing and wishes to purchase a matching item, existing tools leave the user with the burden of determining the color of the clothing and what a matching color might be. Thus, the user is left to matching based on what "appears" to match (subject to variations in color on a screen).

Also, it has been left to the user to make the match and has not been done automatically. For example, it would be beneficial to make color matches that are similar to colors chosen by friends or members of affinity groups. Automatically making color selections for a user based on the aggregate demographic groups in which the user is a member has been nearly impossible.

Current systems further lack the ability to aggregate a user's preferred and/or customized colors onto a unified area or palette for purposes of identifying and searching for products. Individuals typically have preferred colors. and it would be beneficial to have that group of preferred colors collected and readily available to that user in a single palette. Also, use of the palette for forming color combinations and to perform searches based on a primary color and a secondary color (and a pattern) are lacking in the prior art. To that end, it would be beneficial to have that group of preferred colors identified, collected and readily available to that user in a single palette for effective color-based searching.

Another deficiency of prior art systems is the inability for a user to share and communicate his or her color preferences in order to facilitate the purchase of a particular product in a particular color or pattern. Because of this shortcoming, there is a further inability for a user to readily share any color preference with a friend, colleague, or other acquaintance with whom a user may be associated, such as a social networking affinity group. Such sharing capabilities would facilitate a member of a user's affinity group's purchase of an item for the user. For example, in the instance where a user discovers a desired product, say for a wedding or baby registry, that user may wish to save and share that information, particularly the color information, with friends and family. With the rise of computer technologies, connecting and sharing personal information with friends or other networks has become easier and more accessible. In connection with searching and selecting certain items or products, a number of tools and systems are designed for creating and sharing a registry of desired items or products. Nonetheless, these registries are based solely on items and products selected by the registrant and not on products that may be desired by a registrant based on, for example, color preference, demographic information, or color trending information. This information, such as color preference, sizing information, previous purchase information, and the like, may all be utilized by a user to make in-store purchases using a personal shopping assistant application that incorporates all of the user's data, and the data of those in the user's affinity groups. In this manner, the user is able to make a more informed purchase.

OBJECT AND SUMMARY OF THE INVENTION

Therefore, it is an object of the claimed invention to provide a system and method for identifying, searching and matching products based on color using a universal color system.

Another object of the claim invention is to provide aforesaid system and method that searches merchants' inventory management and/or supply chain management systems that have been reverse mapped into hexadecimal codes of the universal color system.

A still another object of the claimed invention is to provide database(s) that both merchants and consumers can search for and match products using non-textual or color based queries.

A yet another object of the claimed invention is to provide aforesaid system and method that can search based on color and patterns in the product image data.

In accordance with an exemplary embodiment of the claimed invention, a computer-based method is provided for searching and matching products based on color using a universal color system. A color-based search query comprising user's color selection is received from a processor based client device associated with a user by a processor based server over a communications network. The user's color selection comprises at least one hexadecimal color code of the universal color system. A database engine is searched by a color search engine of the server for products having hexadecimal color codes within a predetermined range of the hexadecimal color code of the user's color selection to provide a search result. The database engine comprises a plurality of products reverse mapped and organized in accordance with the hexadecimal color codes of the universal color system. The search result is transmitted to the client device associated with the user by the color search engine over the communications network. The user's color selection and the search result are stored in a database, and the color preference history of the user is updated in the database.

In accordance with an exemplary embodiment of the claimed invention, the aforesaid method searches at least one of the following by the color search engine: a data warehouse maintained by a service provider, inventory management systems of a plurality of merchants and supply chain management systems of a plurality of merchants.

In accordance with an exemplary embodiment of the claimed invention, the aforesaid method filters the search result based on the availability of the products from the inventory management systems.

In accordance with an exemplary embodiment of the claimed invention, the aforesaid method ranks the products on the search results based on their availability from merchants within the user's current geo-location.

In accordance with an exemplary embodiment of the claimed invention, the aforesaid method searches the supply chain management systems for products available in a future date matching the user's color selection if no products are currently available from the inventory management systems having the hexadecimal color codes that is within the predetermined range of the hexadecimal color code of the user's color selection.

In accordance with an exemplary embodiment of the claimed invention, the aforesaid method ranks the products on the search result based on their hexadecimal color codes. A product having the hexadecimal color code closer to the hexadecimal color code of the user's color selection being ranked higher than a product having the hexadecimal color code further from the hexadecimal color code of the user's color selection.

In accordance with an exemplary embodiment of the claimed invention, the aforesaid method receives textual search criteria from the client device by the server over the communications network. The textual search criteria comprises at least one of the following: product description, product availability, size information, merchant information, product category, brand information, pattern information, complementary colors or complementary colored products; and filtering the search results based on the textual search criteria.

In accordance with an exemplary embodiment of the claimed invention, the aforesaid method ranks the products on the search result based on the color preference history of the user.

In accordance with an exemplary embodiment of the claimed invention, the aforesaid method receives a purchase request to purchase one or more products on the search results from the client device by the server over the communications network. The purchase request is processed based on user's shipping and billing information stored in the database by a processor of the server or the shipping and billing information is requested from the user via the client device by the processor of the server if the shipping and billing information is not available from the database. The products purchased by the user is stored as a purchase record in the database by the processor of the server. The depersonalized purchase information is stored in the database by the processor of the server.

In accordance with an exemplary embodiment of the claimed invention, the aforesaid method adds a product on the search result to a user's wish list by a user module of the server, and storing the user's wish list in the database by the user module.

In accordance with an exemplary embodiment of the claimed invention, the aforesaid method receives a product from the search result to share with members of user's social group from the client device associated with the user by a registry module of the server over the communications network. The shared product is stored as a social registry record in the database by the registry module.

In accordance with an exemplary embodiment of the claimed invention, the aforesaid method presents a color bar display on the client device associated with the user. The color bar display comprises a plurality of color swatches selected based on at least one of the following: product availability, the color preference history of the user, a color forecast, color trends, timeless colors, or seasonal colors. The color-based search query comprising at least one color swatch selected by the user from the color bar display is received via the client device by the server over the communications network. Each color swatch corresponds to a hexadecimal code of the universal color system. The database engine is searched by the color search engine of the server for products having the hexadecimal code that is within a predetermined range of the hexadecimal code of the selected color swatch of the color-based search query to provide the search result.

In accordance with an exemplary embodiment of the claimed invention, the aforesaid method receives a request to change the color bar display associated with a member of user's social group from the client device associated with the user by the server over the communications network. The color bar display associated with the member is presented on the client device associated with the user. The color-based search query comprising at least one color swatch selected by the user from the color bar display associated with the member is received via the client device associated with the user by the server over the communications network. The database engine is searched by the color search engine of the server for products having the hexadecimal code that is within a predetermined range of the hexadecimal code of the selected color swatch of the color-based search query to provide the search result.

In accordance with an exemplary embodiment of the claimed invention, the color-based search query received from the client device comprises a digital image of the product. The aforesaid method normalizes and codifies the digital image by an image processor of the server by segmenting the digital image into a plurality of segments. Each segment is analyzed to determine a dominant color for each segment. At least one dominant color for the digital image is determined based on prevalence of at least one dominant color in each segment. The identified colors are converted into hexadecimal codes of the universal color system. Products having the hexadecimal code that is within a predetermined range of one or more of the hexadecimal codes of the digital image is searched to provide the search result. The identified colors, hexadecimal codes and the search result are stored in the database.

In accordance with an exemplary embodiment of the claimed invention, the aforesaid method obtains a digital image of a product by the client device associated with the user. The digital image is normalized and codified by a processor of the client device by segmenting the digital image into a plurality of segments. Each segment is analyzed to determine a dominant color for each segment. At least one dominant color for the digital image is determined based on prevalence of at least one dominant color in each segment. The identified colors are converted into hexadecimal codes of the universal color system. The identified colors and the hexadecimal codes are stored in a memory of the client device. The color-based search query comprising the hexadecimal codes associated with the digital image is transmitted to the server over the communications network.

In accordance with an exemplary embodiment of the claimed invention, a computer based method is provided for monitoring manufactured products for quality control using a universal color system. A normalized digital image of a manufactured product is received from a processor based client device associated with a user by a processor based server over a communications network. The normalized digital image comprising at least one hexadecimal color code of the universal color system. At least one hexadecimal color code of a product ordered from the client device is received by the server over the communications network. The hexadecimal code of the manufactured product is compared to the hexadecimal code of the ordered product by a processor of the server to determine whether the color of the manufactured product is within a predetermined threshold of the color of the ordered product. An accept message is transmitted to the client device over the communications network if the color of the manufactured product is within the predetermined threshold of the color of the ordered product. A reject message is transmitted to the client device over the communications network if the color of the manufactured product is not within the predetermined threshold of the color of the ordered product.

In accordance with an exemplary embodiment of the claimed invention, the aforesaid method obtains a digital image of the manufactured product by the client device. The digital image is normalized and codified by a processor of the client device by segmenting the digital image into a plurality of segments. Each segment is analyzed to determine a dominant color for each segment. At least one dominant color for the digital image is determined based on prevalence of at least one dominant color in each segment. The identified colors are converted into hexadecimal codes of the universal color system to provide the normalized digital image. The identified colors, the hexadecimal codes and the normalized digital image are stored in a memory of the client device. The normalized digital image and the associated hexadecimal codes are transmitted to the server by the client device over the communications network.

In accordance with an exemplary embodiment of the claimed invention, a computer based method is provided for monitoring manufactured products for quality control using a universal color system. receiving a digital image of a manufactured product from a processor based client device associated with a user by a processor based server over a communications network. At least one hexadecimal color code of a product ordered is received from the client device by the server over the communications network. The digital image is normalized and codified by an image processor of the server by segmenting the digital image into a plurality of segments. Each segment is analyzed to determine a dominant color for each segment. At least one dominant color for the digital image is determined based on prevalence of at least one dominant color in each segment. The identified colors are converted into hexadecimal codes of the universal color system to provide the normalized digital image. The identified colors, the hexadecimal codes and the normalized digital image are stored in a database. The hexadecimal code of the manufactured product is compared to the hexadecimal code of the ordered product by the image processor of the server to determine whether the color of the manufactured product is within a predetermined threshold of the color of the ordered product. An accept message is transmitted to the client device over the communications network if the color of the manufactured product is within the predetermined threshold of the color of the ordered product. A reject message is transmitted to the client device over the communications network if the color of the manufactured product is not within the predetermined threshold of the color of the ordered product.

In accordance with an exemplary embodiment of the claimed invention, a system for searching and matching products based on color using a universal color system comprises a plurality of processor based client devices, each client device uniquely associated with a user, a database engine comprising a plurality of products reverse mapped and organized in accordance with the hexadecimal color codes of the universal color system, and a processor based server. The server receives a color-based search query comprising user's color selection from a client device associated with a user over a communications network. The user's color selection comprises at least one hexadecimal color code of the universal color system. A color engine of the server searches the database engine for products having the hexadecimal color codes within a predetermined range of the hexadecimal color code of the user's color selection to provide a search result. The color engine transmits the search result to the client device associated with the user over the communications network. A database stores the user's color selection and the search result in a database, and updates the color preference history of the user.

In accordance with an exemplary embodiment of the claimed invention, the aforesaid color search engine searches at least one of the following: a data warehouse maintained by a service provider, inventory management systems of a plurality of merchants and supply chain management systems of a plurality of merchants.

In accordance with an exemplary embodiment of the claimed invention, the aforesaid color search engine filters the search result based on the availability of the products from the inventory management systems.

In accordance with an exemplary embodiment of the claimed invention, the aforesaid color engine ranks the products on the search results based on their availability from merchants within the user's current geo-location.

In accordance with an exemplary embodiment of the claimed invention, the aforesaid color search engine searches the supply chain management systems for products available in a future date matching the user's color selection if no products are currently available from the inventory management systems having the hexadecimal color codes that is within the predetermined range of the hexadecimal color code of the user's color selection.

In accordance with an exemplary embodiment of the claimed invention, the aforesaid color search engine ranks the products on the search result based on their hexadecimal color codes. A product having the hexadecimal color code closer to the hexadecimal color code of the user's color selection being ranked higher than a product having the hexadecimal color code further from the hexadecimal color code of the user's color selection.

In accordance with an exemplary embodiment of the claimed invention, the aforesaid color engine ranks the products on the search result based on the color preference history of the user.

In accordance with an exemplary embodiment of the claimed invention, the aforesaid server receives textual search criteria from the client device over the communications network. The textual search criteria comprises at least one of the following: product description, product availability, size information, merchant information, product category, brand information, pattern information, complementary colors or complementary colored products; and filtering the search results based on the textual search criteria.

In accordance with an exemplary embodiment of the claimed invention, the aforesaid server receives a purchase request to purchase one or more products on the search results from the client device over the communications network. A processor of the server processes the purchase request based on user's shipping and billing information stored in the database or requests shipping and billing information from the user via the client device if the shipping and billing information is not available from the database. The aforesaid database stores the products purchased by the user as a purchase record and stores depersonalized purchase information.

In accordance with an exemplary embodiment of the claimed invention, the aforesaid server further comprises a user module for adding a product on the search result to a user's wish list and storing the user's wish list in the database.

In accordance with an exemplary embodiment of the claimed invention, the aforesaid server further comprises a registry module for receiving a product from the search result to share with members of user's social group from the client device associated with the user over the communications network. The registry module stores the shared product as a social registry record in the database.

In accordance with an exemplary embodiment of the claimed invention, the aforesaid color search engine presents a color bar display on the client device associated with the user. The color bar display comprises a plurality of color swatches selected based on at least one of the following: product availability, the color preference history of the user, a color forecast, color trends, timeless colors, or seasonal colors. The aforesaid server receives the color-based search query comprising at least one color swatch selected by the user from the color bar display via the client device over the communications network. Each color swatch corresponds to a hexadecimal code of the universal color system. The aforesaid color search engine searches the database engine for products having the hexadecimal code that is within a predetermined range of the hexadecimal code of the selected color swatch of the color-based search query to provide the search result.

In accordance with an exemplary embodiment of the claimed invention, the aforesaid server receives a request to change the color bar display associated with a member of user's social group from the client device associated with the user over the communications network. The aforesaid color search engine presents the color bar display associated with the member on the client device associated with the user. The aforesaid server receives the color-based search query comprising at least one color swatch selected by the user from the color bar display associated with the member via the client device associated with the user over the communications network. The aforesaid color search engine searches the database engine for products having the hexadecimal code that is within a predetermined range of the hexadecimal code of the selected color swatch of the color-based search query to provide the search result.

In accordance with an exemplary embodiment of the claimed invention, the color-based search query from the client device comprises a digital image of the product. The aforesaid server further comprises an image processor for normalizing and codifying the digital image by segmenting the digital image into a plurality of segments. The image processor analyzes each segment to determine a dominant color for each segment and determines at least one dominant color for the digital image based on prevalence of at least one dominant color in each segment. The image processor converts the identified colors into hexadecimal codes of the universal color system, and searches for products having the hexadecimal code that is within the predetermined range of one or more of the hexadecimal codes of the digital image to provide the search result. The database stores the identified colors, hexadecimal codes and the search result.

In accordance with an exemplary embodiment of the claimed invention, the aforesaid client device associated with the user obtains a digital image of a product. The client device further comprises a processor for normalizing and codifying the digital image by segmenting the digital image into a plurality of segments. The processor analyzes each segment to determine a dominant color for each segment, and determines at least one dominant color for the digital image based on prevalence of at least one dominant color in each segment.

The processor converts the identified colors into hexadecimal codes of the universal color system and stores the identified colors and the hexadecimal codes in a memory of the client device. The aforesaid client device transmits the color-based search query comprising the hexadecimal codes associated with the digital image to the server over the communications network.

In accordance with an exemplary embodiment of the claimed invention, a system for monitoring manufactured products for quality control using a universal color system comprises a plurality of processor based client devices, each client device uniquely associated with a user and connected to a communications network, and a processor based server. The server receives a normalized digital image of a manufactured product from a client device associated with a user over the communications network and receives at least one hexadecimal color code of a product ordered from the client device over the communications network. The normalized digital image comprises at least one hexadecimal color code of the universal color system. A processor of the server compares the hexadecimal code of the manufactured product to the hexadecimal code of the ordered product to determine whether the color of the manufactured product is within a predetermined threshold of the color of the ordered product. The processor transmits an accept message to the client device over the communications network if the color of the manufactured product is within the predetermined threshold of the color of the ordered product. The processor transmits a reject message to the client device over the communications network if the color of the manufactured product is not within the predetermined threshold of the color of the ordered product.

In accordance with an exemplary embodiment of the claimed invention, the aforesaid client device associated with the user obtains a digital image of the manufactured product by the client device. A processor of the client device normalizes and codifies the digital image by segmenting the digital image into a plurality of segments. The processor analyzes each segment to determine a dominant color for each segment, and determines at least one dominant color for the digital image based on prevalence of at least one dominant color in each segment. The processor converts the identified colors into hexadecimal codes of the universal color system to provide the normalized digital image. A memory of the client device stores the identified colors, the hexadecimal codes and the normalized digital image. The client device transmits the normalized digital image and the associated hexadecimal codes to the server over the communications network.

In accordance with an exemplary embodiment of the claimed invention, a system for monitoring manufactured products for quality control using a universal color system comprises a plurality of processor based client devices, each client device uniquely associated with a user and connected to a communications network, a processor based server and a database. The server receives a digital image of a manufactured product from a client device associated with a user over a communications network, and receives at least one hexadecimal color code of a product ordered from the client device over the communications network. A image processor of the server normalizes and codifies he digital image by segmenting the digital image into a plurality of segments. The image processor analyzes each segment to determine a dominant color for each segment and determines at least one dominant color for the digital image based on prevalence of at least one dominant color in each segment. The image processor converts the identified colors into hexadecimal codes of the universal color system to provide the normalized digital image.

The image processor compares the hexadecimal code of the manufactured product to the hexadecimal code of the ordered product to determine whether the color of the manufactured product is within a predetermined threshold of the color of the ordered product. The image processor transmits an accept message to the client device over the communications network if the color of the manufactured product is within the predetermined threshold of the color of the ordered product. The image processor transmits a reject message to the client device over the communications network if the color of the manufactured product is not within the predetermined threshold of the color of the ordered product. The database stores the identified colors, the hexadecimal codes and the normalized digital image.

In accordance with an exemplary embodiment of the claimed invention, a non-transitory computer readable medium comprises computer executable code for searching and matching products based on color using a universal color system. The code comprises instructions for receiving a color-based search query comprising user's color selection from a processor based client device associated with a user by a processor based server over a communications network. The user's color selection comprises at least one hexadecimal color code of the universal color system. A color search engine of the server is instructed to search a database engine for products having the hexadecimal color codes within a predetermined range of the hexadecimal color code of the user's color selection to provide a search result. The database engine comprises a plurality of products reverse mapped and organized in accordance with the hexadecimal color codes of the universal color system. The color search engine is instructed to transmit the search result to the client device associated with the user over the communications network. The database is instructed to store the user's color selection and the search result, and to update the color preference history of the user.

In accordance with an exemplary embodiment of the claimed invention, the aforesaid code comprises instruction for the color search engine to search at least one of the following by the color search engine: a data warehouse maintained by a service provider, inventory management systems of a plurality of merchants and supply chain management systems of a plurality of merchants.

In accordance with an exemplary embodiment of the claimed invention, the aforesaid code comprises instruction for the color search engine to filter the search result based on the availability of the products from the inventory management systems.

In accordance with an exemplary embodiment of the claimed invention, the aforesaid code comprises instruction for the color search engine to rank the products on the search results based on their availability from merchants within the user's current geo-location.

In accordance with an exemplary embodiment of the claimed invention, the aforesaid code comprises instruction for the color search engine to search the supply chain management systems for products available in a future date matching the user's color selection if no products are currently available from the inventory management systems having the hexadecimal color codes that is within the predetermined range of the hexadecimal color code of the user's color selection.

In accordance with an exemplary embodiment of the claimed invention, the aforesaid code comprises instruction for the color search engine to rank the products on the search result based on their hexadecimal color codes. A product having the hexadecimal color code closer to the hexadecimal color code of the user's color selection being ranked higher than a product having the hexadecimal color code further from the hexadecimal color code of the user's color selection.

In accordance with an exemplary embodiment of the claimed invention, the aforesaid code comprises instruction for the color search engine to receive textual search criteria from the client device by the server over the communications network. The textual search criteria comprises at least one of the following: product description, product availability, size information, merchant information, product category, brand information, pattern information, complementary colors or complementary colored products; and filtering the search results based on the textual search criteria.

In accordance with an exemplary embodiment of the claimed invention, the aforesaid code comprises instructions for the color search engine to rank the products on the search result based on the color preference history of the user.

In accordance with an exemplary embodiment of the claimed invention, the aforesaid code comprises instructions for the server to receive a purchase request to purchase one or more products on the search results from the client device over the communications network. The processor of the server is instructed to process the purchase request based on user's shipping and billing information stored in the database or to request the shipping and billing information from the user via the client device if the shipping and billing information is not available from the database. The processor is instructed to store the products purchased by the user as a purchase record and depersonalized purchase information in the database.

In accordance with an exemplary embodiment of the claimed invention, the aforesaid code comprises instructions for a user module of the server to add a product on the search result to a user's wish list, and to store the user's wish list in the database.

In accordance with an exemplary embodiment of the claimed invention, the aforesaid code comprises instructions for a registry module of the server to receive a product from the search result to share with members of user's social group from the client device associated with the user over the communications network. The registry module is instructed to store the shared product as a social registry record in the database.

In accordance with an exemplary embodiment of the claimed invention, the aforesaid code comprises instructions for the color search engine to present a color bar display on the client device associated with the user. The color bar display comprises a plurality of color swatches selected based on at least one of the following: product availability, the color preference history of the user, a color forecast, color trends, timeless colors, or seasonal colors. The server is instructed to receive the color-based search query comprising at least one color swatch selected by the user from the color bar display via the client device over the communications network. Each color swatch corresponds to a hexadecimal code of the universal color system. The color search engine is instructed to search the database engine for products having the hexadecimal code that is within a predetermined range of the hexadecimal code of the selected color swatch of the color-based search query to provide the search result.

In accordance with an exemplary embodiment of the claimed invention, the aforesaid code comprises instructions for the server to receive a request to change the color bar display associated with a member of user's social group from the client device associated with the user over the communications network. The color search engine is instructed to present the color bar display associated with the member on the client device associated with the user. The server is instructed to receive the color-based search query comprising at least one color swatch selected by the user from the color bar display associated with the member via the client device associated with the user over the communications network. The color search engine is instructed to search the database engine for products having the hexadecimal code that is same as or within a predetermined range of the hexadecimal code of the selected color swatch of the color-based search query to provide the search result.

In accordance with an exemplary embodiment of the claimed invention, the color-based search query from the client device comprises a digital image of the product. The aforesaid code comprises instructions for an image processor of the server to normalize and codify the digital image by segmenting the digital image into a plurality of segments. The image processor is instructed to analyze each segment to determine a dominant color for each segment and to determine at least one dominant color for the digital image based on prevalence of at least one dominant color in each segment. The image processor is instructed to convert the identified colors into hexadecimal codes of the universal color system, and to search for products having the hexadecimal code that is within a predetermined range of one or more of the hexadecimal codes of the digital image to provide the search result. The database is instructed to store the identified colors, hexadecimal codes and the search result.

In accordance with an exemplary embodiment of the claimed invention, the aforesaid code comprises instructions for the client device associated with the user to obtain a digital image. A processor of the client device is instructed to normalize and codify the digital image by segmenting the digital image into a plurality of segments. The processor is instructed to analyze each segment to determine a dominant color for each segment and to determine at least one dominant color for the digital image based on prevalence of at least one dominant color in each segment. The processor is instructed to convert the identified colors into hexadecimal codes of the universal color system, and to store the identified colors and the hexadecimal codes in a memory of the client device. The processor is instructed to transmit the color-based search query comprising the hexadecimal codes associated with the digital image to the server over the communications network.

In accordance with an exemplary embodiment of the claimed invention, a non-transitory computer readable medium comprises computer executable code for monitoring manufactured products for quality control using a universal color system. The code comprising instructions for a processor based server to receive a normalized digital image of a manufactured product from a processor based client device associated with a user over a communications network. The normalized digital image comprises at least one hexadecimal color code of the universal color system. The server is instructed to receive at least one hexadecimal color code of a product ordered from the client device over the communications network. A processor of the server is instructed to compare the hexadecimal code of the manufactured product to the hexadecimal code of the ordered product to determine whether the color of the manufactured product is within a predetermined threshold of the color of the ordered product. The processor of the server is instructed to transmit an accept message to the client device over the communications network if the color of the manufactured product is within the predetermined threshold of the color of the ordered product. The processor of the server is instructed to transmit a reject message to the client device over the communications network if the color of the manufactured product is not within the predetermined threshold of the color of the ordered product.

In accordance with an exemplary embodiment of the claimed invention, the aforesaid code comprises instructions for the client device associated with the user to obtain a digital image of the manufactured product. A processor of the client device is instructed to normalize and codify the digital image by segmenting the digital image into a plurality of segments. The processor of the client device is instructed to analyze each segment to determine a dominant color for each segment, and to determine at least one dominant color for the digital image based on prevalence of at least one dominant color in each segment. The processor of the client device is instructed to convert the identified colors into hexadecimal codes of the universal color system to provide the normalized digital image. The processor of the client device is instructed to store the identified colors, the hexadecimal codes and the normalized digital image in a memory of the client device. The client device is instructed to transmit the normalized digital image and the associated hexadecimal codes to the server over the communications network.

In accordance with an exemplary embodiment of the claimed invention, a non-transitory computer readable medium comprises computer executable code for monitoring manufactured products for quality control using a universal color system. The code comprising instructions for a processor based server to receive a digital image of a manufactured product from a processor based client device associated with a user over a communications network. The server is instructed to receive at least one hexadecimal color code of a product ordered from the client device over the communications network. An image processor of the server is instructed to normalize and codify the digital image by segmenting the digital image into a plurality of segments. The image processor is instructed to analyze each segment to determine a dominant color for each segment, and to determine at least one dominant color for the digital image based on prevalence of at least one dominant color in each segment. The image processor is instructed to convert the identified colors into hexadecimal codes of the universal color system to provide the normalized digital image, and to store the identified colors, the hexadecimal codes and the normalized digital image in a database. The image processor is instructed to compare the hexadecimal code of the manufactured product to the hexadecimal code of the ordered product to determine whether the color of the manufactured product is within a predetermined threshold of the color of the ordered product. The image processor is instructed to transmit an accept message to the client device over the communications network if the color of the manufactured product is within the predetermined threshold of the color of the ordered product. The image processor is instructed to transmit a reject message to the client device over the communications network if the color of the manufactured product is not within the predetermined threshold of the color of the ordered product.

The claimed invention may stand on its own or serve as an enhancement of or upgrade to existing IMS and/or SCM systems directed to facilitating a wide range of functions, including search, product selection, purchase, marketing, advertising, product planning and sales. The claimed invention can apply operations research principles to selected problems in retailing by organizing and identifying products according to color and/or pattern and by using those attributes as primary indicators, where retailing extends from product development and manufacturing through customer service.

In accordance with an exemplary embodiment of the claimed invention, aforesaid system and method can be utilized to dynamically analyze codified color-based preferences, trends and system-wide activities to make targeted and micro-targeted product recommendations to users with color as a primary product attribute.

Generally, the claimed invention provides a system, methods and a set of interfaces that provide users and merchants with a number of previously unavailable opportunities and tools in the context of color identification, selection and matching. The non-textual color searches utilizing the universal color codes provide users with relevant search results for a number of merchant products that correlate more closely (or exactly) to the colors for which a user is searching.

With respect to the hardware of the system, CPU-based servers are arranged to communicate with one another and with one or more data warehouses, preferably residing therein, which are used to store user data, merchant data, product data, and color data.

Various other objects, advantages and features of the present invention will become readily apparent from the ensuing detailed description, and the novel features will be particularly pointed out in the appended claims.

BRIEF DESCRIPTION OF THE DRAWINGS

The above-described and other advantages and features of the present disclosure will be appreciated and understood by those skilled in the art from the following detailed description and drawings of which.

DETAILED DESCRIPTION OF THE EMBODIMENTS

In accordance with an exemplary embodiment of the claimed invention, non-textual color-based systems, methods and interfaces are provided to search and match products based on color using a unified or universal color system as described in applicant's co-pending application Ser. Nos. 13/910,557 and PCT/US13/44317 (hereinafter "applicant's '557 application"), which is incorporated herein by reference in its entirety and not based certain textual representation of color. One of the most important factors that influence consumer purchase decisions is color, accordingly, the claimed invention proceeds upon desirability providing a system and method for searching and matching products based on color to provide consumers with in-store shopping experiences while shopping online.

In accordance with an exemplary embodiment of the claimed invention, the claimed color-based system and method can additionally collect, analyze and manage other non-color data, such as textual product data, and anonymous and non-anonymous user and merchant data, to provide a more robust product searching and purchase experience for users and a more effective means for merchants to target, advertise and sell to consumers.

Figure 1:
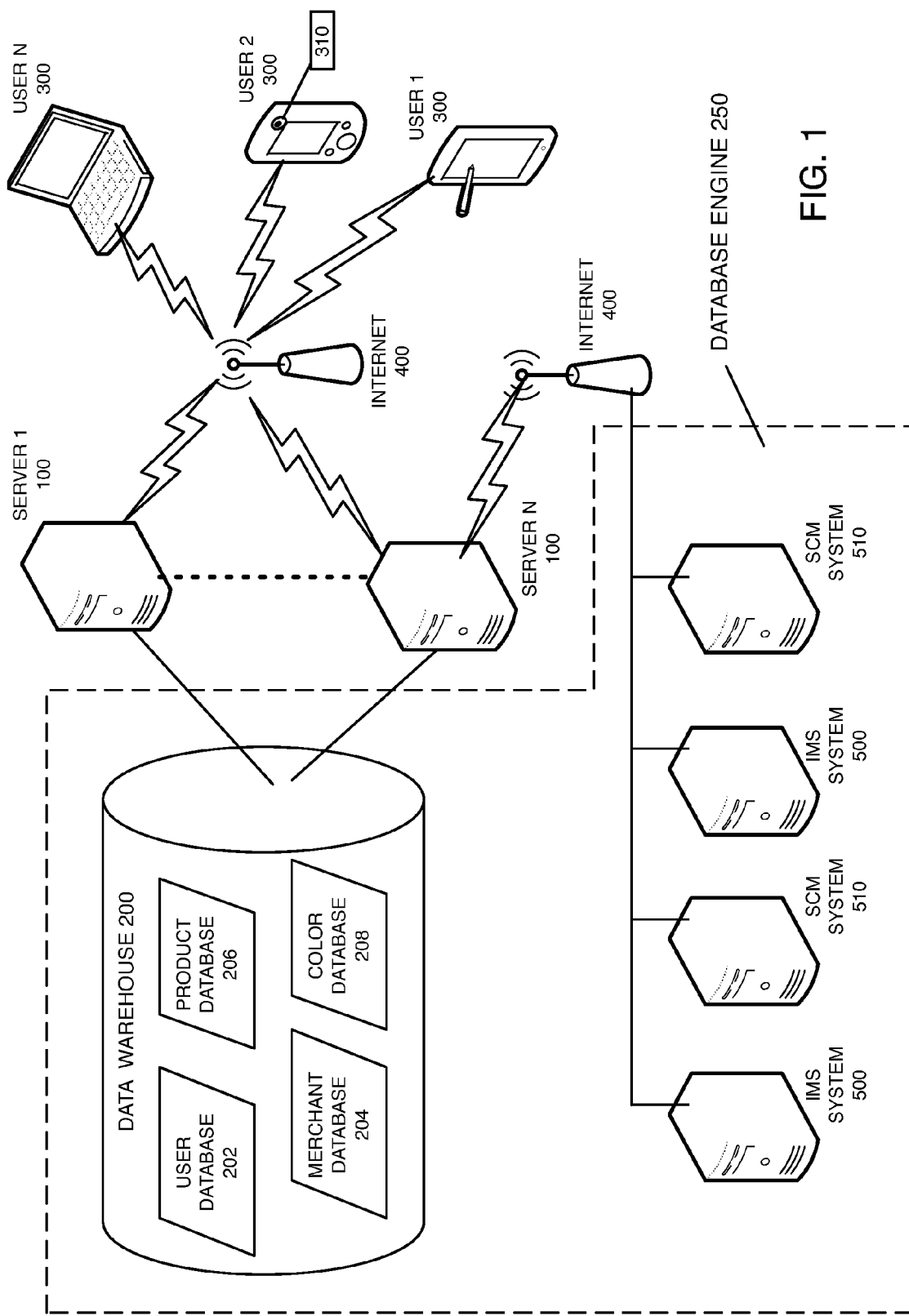
FIG. 1 is a block diagram of the system in accordance with an exemplary embodiment of the claimed invention.

Turning to FIG. 1, in accordance with an exemplary embodiment of the claimed invention, there is shown an exemplary system configuration comprising a processor-based system 100, such as one or more computers or servers 100, with hard disk or memory drives running software comprising machine-readable program instructions. Server 100 serves as and/or provides access to data warehouse 200, which comprises product database 206 and color database 208. Preferably, the data warehouse 200 also comprises user database 202 and merchant database 204. All data are maintained in data warehouse 200 or other conventional database system having read and write accessibility using a database management system. Although described herein for illustrative purposes as being separate data stores, in at least some alternative embodiments, the data stores may be combined in various combinations.

Figure 13:
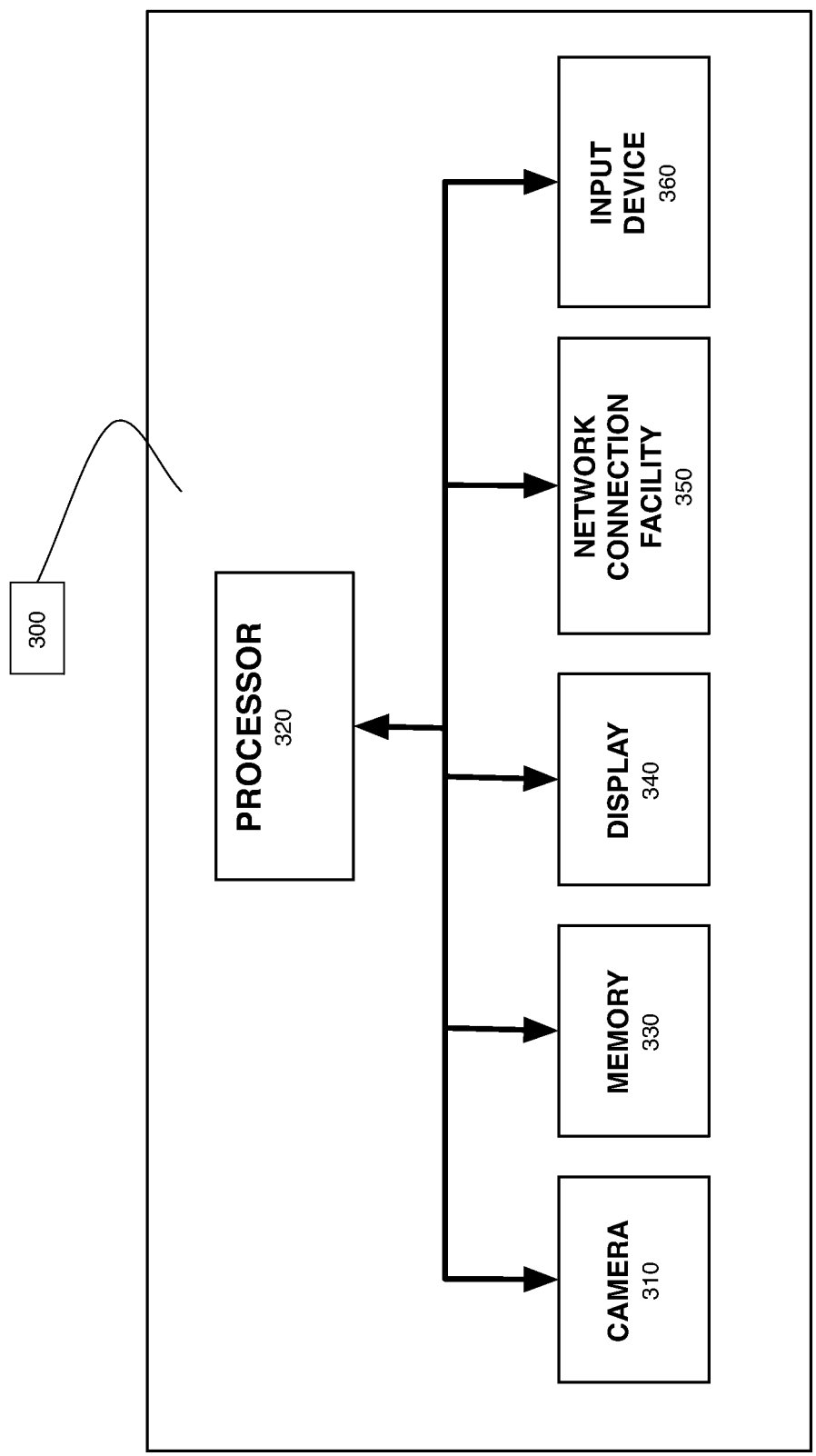
FIG. 13 is block diagram of the client device in accordance with an exemplary embodiment of the claimed invention.

Information contained in data warehouse 200 is accessible by both consumer and merchant users via client devices 300 over a communications network 400, such as the Internet 400. Client devices 300 comprise processor-based machine(s), such as laptops, PCs, tablets, smart phones and/or other web-enabled handheld devices to and from which server 100 communicates. In accordance with an exemplary embodiment of the claimed invention, as exemplary shown in FIG. 13, the client device 300 comprises a processor 320, a camera 310, a memory 330, a display 340, a network connection facility 350 and input device 360. Client devices 300 are connected to server 100 utilizing customizable interfaces described herein. Custom interfaces may be in the form of a graphical user interface, an application to form a client-server arrangement and/or other well-known interface conventions known in the art. Depending on the nature of the user and its access to various forms of information, different interfaces are made available. To support various options, the system of the present invention preferably includes at least one application-programming interface (API) so that certain types of users could enhance their interfaces, and different ones may be available for users and merchants.

In accordance with an exemplary embodiment of the claimed invention, subscribers (consumer or merchant users, etc.) gain entry to the server 100 by subscription using known security methodologies, e.g., username and password combination. Once a subscriber is authenticated, the server 100 provides access to the data that the subscriber can rightfully access.

In accordance with an exemplary embodiment of the claimed invention, the server 100 stores/maintains hexadecimal and RGB color code or identification information and pattern identification information in the color database 208. Each individual color identification entry corresponds to one of a plurality of uniform/universal colors stored in the color database 208 and each individual pattern identification entry corresponds to one of a plurality of selectable patterns stored in the color database 208.

In accordance with an exemplary embodiment of the claimed invention, the system, methods and interfaces described herein are designed to operate in a 4096 universal color environment, but on a scale which allows the system to expand to over 16 million universal colors using the full range of 256 color intensities (measured from 0 to 255) for each of R (Red), G (Green) and B (Blue) which yields $256^3$ or 16,777,216 possible color variations, and hence potential 16 million universal color codes or classifications. The claimed invention utilizes the divergent color systems of multiple merchants that have been reverse mapped, normalized and codified into a universal system for dynamic analysis, as described in applicant's '557 application. Preferably, the 4096 selectable universal colors are equidistantly spaced along the full scale of available colors. However, it should be understood that the selectable colors may be moved along the scale or added or subtracted in order to provide more or less variation in a particular color region, depending on user and merchant trends or needs.

As described in applicant's '557 application, the server 100 receives product information (i.e., feeds) over the communications network 400 from a plurality of merchants. The server 100 receives the feeds from retailers', wholesalers', and/or manufacturers' inventory management ("IMS") systems 500 or supply chain management ("SCM") systems 510. It is appreciated that for simplicity merchants, retailers, wholesalers and manufacturers will be collectively and interchangeably referred to herein as merchants. Preferably, as new products are added or product information is updated in the IMS system 500 and/or the SCM system 510, the corresponding information is transmitted to the server 100. That is, the IMS system 500 and/or SCM system 510 dynamically transmit the updated information to the server 100.

By utilizing the universal color system for a plurality of merchants, the claimed invention resolves a significant hindrance to user searching for and finding products from different merchants. Reverse mapping enables dynamic analysis and codification of precise color. When layered into proprietary merchant IMS systems 500 and/or SCM systems 510, the search performed in accordance with an exemplary embodiment of the claimed invention is further enhanced as it is no longer requires scraping the Internet. Likewise, the claimed invention ameliorates issues associated with merchant product planning and production by providing them with standardized color information on sales, searches and availability.

Figure 2:
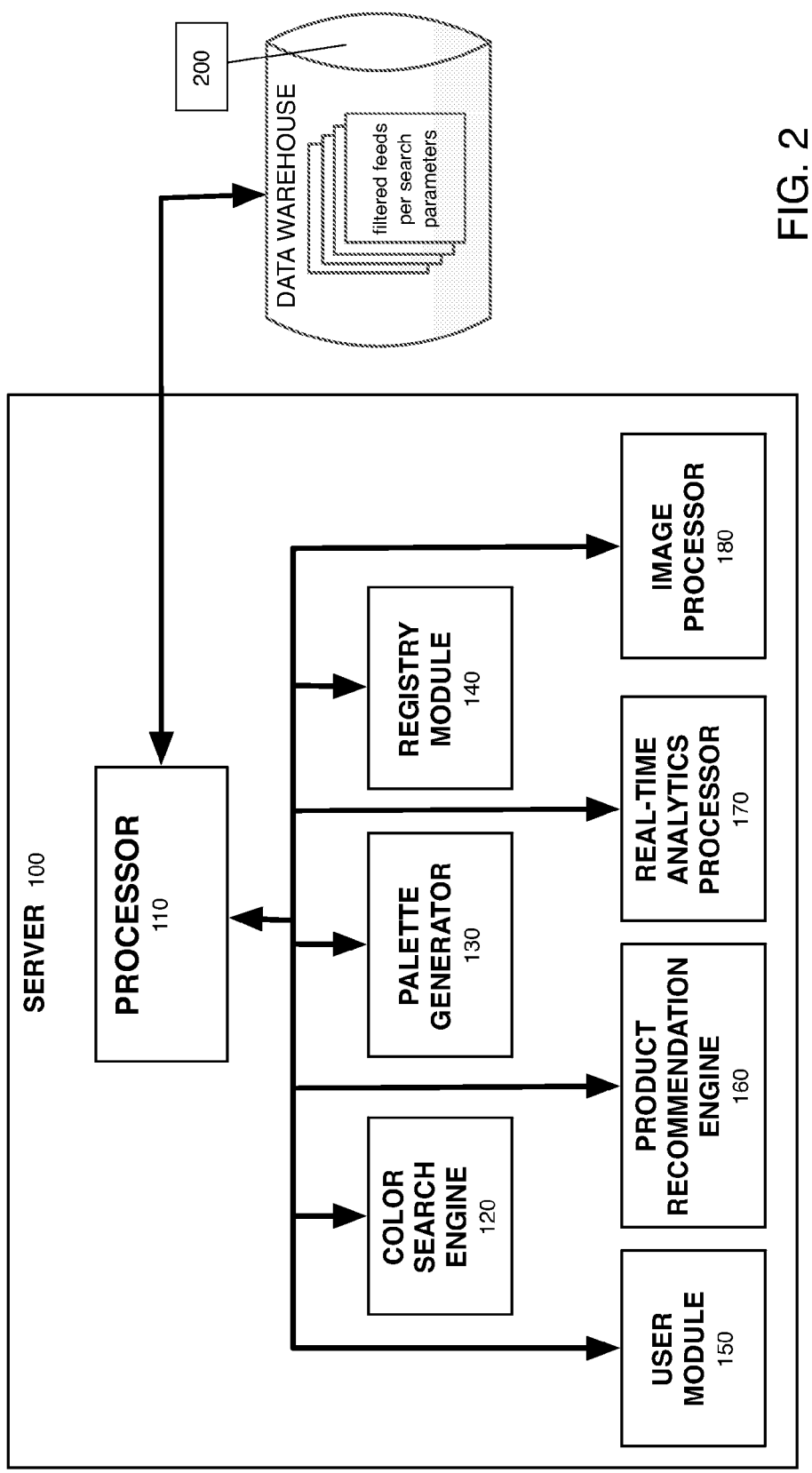
FIG. 2 is a block diagram of the server in accordance with an exemplary embodiment of the claimed invention.

In accordance with an exemplary embodiment of the claimed invention, as shown in FIG. 2, the server 100 comprises one or more processors 110, a color search engine 120, a palette generator 130, a registry module 140, a user module 150, a product recommendation engine 160, a real-time analytics processor 170 and an image processor 180. The server 100 obtains data from a variety of sources. In accordance with an exemplary embodiment of the claimed invention, the color palette generator 130 of the server 100 generates color palette based on the user's personal and demographic information, such as, but not limited to, name, location, birth date, preferred products, and preferred colors, obtained from a user/subscriber (or a different user/subscriber) by the user module 150 of the server 100. The processor 110 of the server 100 obtains data regarding products and inventories from merchants' IMS systems 500 as part of the IMS feeds 505 and/or from merchants' SCM systems 510 as part of the SCM feeds 515, and the data may be in the form of text, images, videos, or some combination thereof Each data set introduced in the data warehouse 200 represents interrelated data sets that communicate with and rely on other data sets for complete information (but do not necessarily represent discrete data sets). These data sets may be accessed using a variety of database management systems (DBMS), including but not limited to relational database management systems (RDBMS) and "post-relational" database management systems (e.g., not only Structured Query Language ("NOSQL") database management systems. Furthermore, by using a DBMS such as RDBMS or a "post-relational" DBMS, the data may be available to a merchant in a variety of manners, such as based on a specific demographic profile or a specific color or color grouping.

In accordance with an exemplary embodiment of the claimed invention, the user database 202 maintains and stores data specific to an individual user/subscriber, including but not limited to, personal information, demographic information, preferences, product history information, and social information. Personal information can include username, name, address (and more generalized geographic information), telephone data, birth date, astrological information, keywords with which the user associates, colors with which the user associates specific keywords, etc. Demographic information can include age, gender, education history, income, marital status, occupation, religion and the like. Preferences can include user's preference of colors, keywords with which the user associates a particular color, books, games, hobbies, sports, sports teams and the like. Some of the preferences can be obtained directly from the user and other preferences can be determined by the user module 150 of the server based on user's web searches and/or purchases. Product history information can include user's browsing history, user's product ratings (e.g., likes and hides), user's purchase history, user's favorite stores, user's favorite brands, etc. Social information can include user-to-user or user-to-merchant associations including, but not limited to, friends, family, colleague, romance, and acquaintance associations.

Personal information and demographic information are typically acquired from a user in the context of an initial user registration process and subsequently stored in the user database 202 which contain a broad range of records pertaining to user identification and user selections. The remaining forms of user data are acquired and recorded in the user database 202 as a result of user-system interactions via a graphical user interface.

In accordance with an exemplary embodiment of the claimed invention, the merchant database 204 maintains and stores data specifics to a merchant, including but not limited to merchant information, e.g., business name, contact name, address, and telephone number; demographic information, e.g., target demographics, user and merchant demographics and preferences; physical locations; inventory information; supply chain information; plan-o-gram and store schematic information; and purchase history information.

In accordance with an exemplary embodiment of the claimed invention, product database 206 maintains and stores data specifics for products, including but not limited to: basic product identification information, including name of product; color identification information, including universal hexadecimal color code, color histogram and statistical information; pattern identification information, where applicable; image data, preferably in the form of a three-dimensional digital rendition of the product or another form of digital image of the product; recommendation data, including historical recommendations of products, ratings of products and advertisement data pertaining to products; and current and future product availability information. Preferably, the product data is indexed and categorized by product category, e.g., tables, chairs, shoes, shirts, socks, cars, paints, etc.

It should be appreciated that the product data stored in the product database 206 can be indexed and cross-referenced in a number of useful ways by associating the product data with specific types of user data, merchant data and color data. Thus, various types of product data can be referenced and manipulated utilizing, for example, any combination of color, availability, user preference and demographic. In that way, data in the data warehouse 200 is interrelated forming a powerful tool in the context of predictive analytics.

In accordance with an exemplary embodiment of the claimed invention, color database 208 maintains and stores data specifics for color information, including but not limited to: hexadecimal color code or identification information; RGB color identification information; pattern identification information; statistical color information; keyword information; and color grouping information. The hexadecimal color code or identification information is stored in the color database 208 as color data in the form of hexadecimal codes for each selectable color. The RGB color identification information is stored in the color database 208 as color data in the form of RGB component intensities for each selectable color. Preferably, each RGB component intensity maps to a corresponding hexadecimal code. The pattern identification information is stored in the color database 208 as color data in the form of pre-determined pattern configurations.

The statistical color information stored in the color database 208 as color data provides information relating to popularity or frequency of the product's color, e.g., frequency of men shirts containing a particular color. It can also provide trending information as to which product colors were popular in the current season and which product colors are forecasted to be popular in the next season based consumer purchases. This can be valuable to manufacturers and retailers in determining what product colors to manufacture and stock in their stores.

The keyword information stored in the color database 208 as color data can be frequently user-associated keywords relating to a particular color. The associated keywords may be based on an original color-word association index; user-defined keywords whereby a user associates colors with specific keywords; and pre-determined keywords which the user links with colors that the user determines are associated with those pre-determined keywords. The server 100 stores and updates keywords and their color associations as users continue to update and create associations in the color database 208. Color grouping information stored in the color database 208 as color data can be colors associated with a timeless collection or a particular trending collection (e.g., Spring 2012 colors).

It should be appreciated that data stored in the color database 208 as color data can be indexed and cross-referenced in a number of useful ways by associating color data with specific types of user data, merchant data and product data. In this way, data in the data warehouse 200 is interrelated forming a powerful tool in the context of predictive analytics.

By integrating a universal color identification technique into proprietary IMS systems 500 and/or SCM systems 510, available color data can be dynamically analyzed and integrated to enable merchants to make color-based decisions and recommendations on a real-time basis that were heretofore not practical or, at best, based on incomplete information. With respect to supply chain management, inventories of products by particular colors can be managed and prioritized and decisions to replenish inventories can be effected sooner by triggering manufacturing and distribution as soon as, for example, certain sales thresholds are met, inventories dip below a particular level and/or additional consumer need is identified beyond current supply plans and capabilities. Moreover, merchants can also advertise and give information users on expected availability using available supply chain management information. Similarly, such information can be used to allow users to pre-order products. On the inventory side, inventories of available products can be kept more stable by promoting products based on current and near-term availability. Furthermore, where a particular color for a product is unavailable, default settings enable recommendations to be made of the closest matching color. Thus, product search and recommendations can be made considering both current and future inventories.

In the examples presented above, colors are determined and classified in 6-digit hexadecimal values or hexadecimal code. However, it should be understood that the available colors for classification can be adjusted to correspond to an expandable or fixed color environment. For example, in an expandable environment of colors, a color in a given image is assigned a 6-digit hexadecimal value (and corresponding RGB values) that corresponds to one of the 4,096 selectable values but can expand to include additional colors as needed. The assignment of the 6-digit hexadecimal value (and corresponding RGB values) enables expansion if additional colors are desired beyond 4,096 through the 16+ million colors that are actually available. It should be appreciated that each hexadecimal code can be converted into component RGB values and/or a binary representation.

In a fixed environment of 4,096 colors, each of the component RGB colors presented on a scale of 0 to 255 can be adjusted downward to 16 intensities of RGB, respectively, on a scale of 0-15. Based on the 16 color intensities of each of these colors, a total of $16^3$ or 4096 colors variations are possible. For example, the color identified in hexadecimal code as CB93B1 and corresponding RGB values: 203 Red: 147 Green: 177 Blue could be adjusted on a 4096 color scale to hexadecimal code C9B and corresponding RGB values: 13 Red: 9 Green: 11 Blue, by using the closest values on the 16-level RGB scale. On this form of scale, these values would be associated with a product, such as a shirt, to which the image or color swatch belongs such that when a query for color C9B is made, one of the recommendations and or product results is the shirt. While utilizing only 16 RGB intensities (and 3 hexadecimal digits) does not easily lend itself to color expansion, it still permits a fair level of color variance sufficient for consumer and merchant classification. The full 4096 hexadecimal codes of the claimed invention is more fully set forth and described in applicant's co-pending application Ser. Nos. 13/762,160 and PCT/US123/25135 (hereinafter "applicant's '160 application"), each of which is incorporated herein by reference in its entirety.

Figure 3:
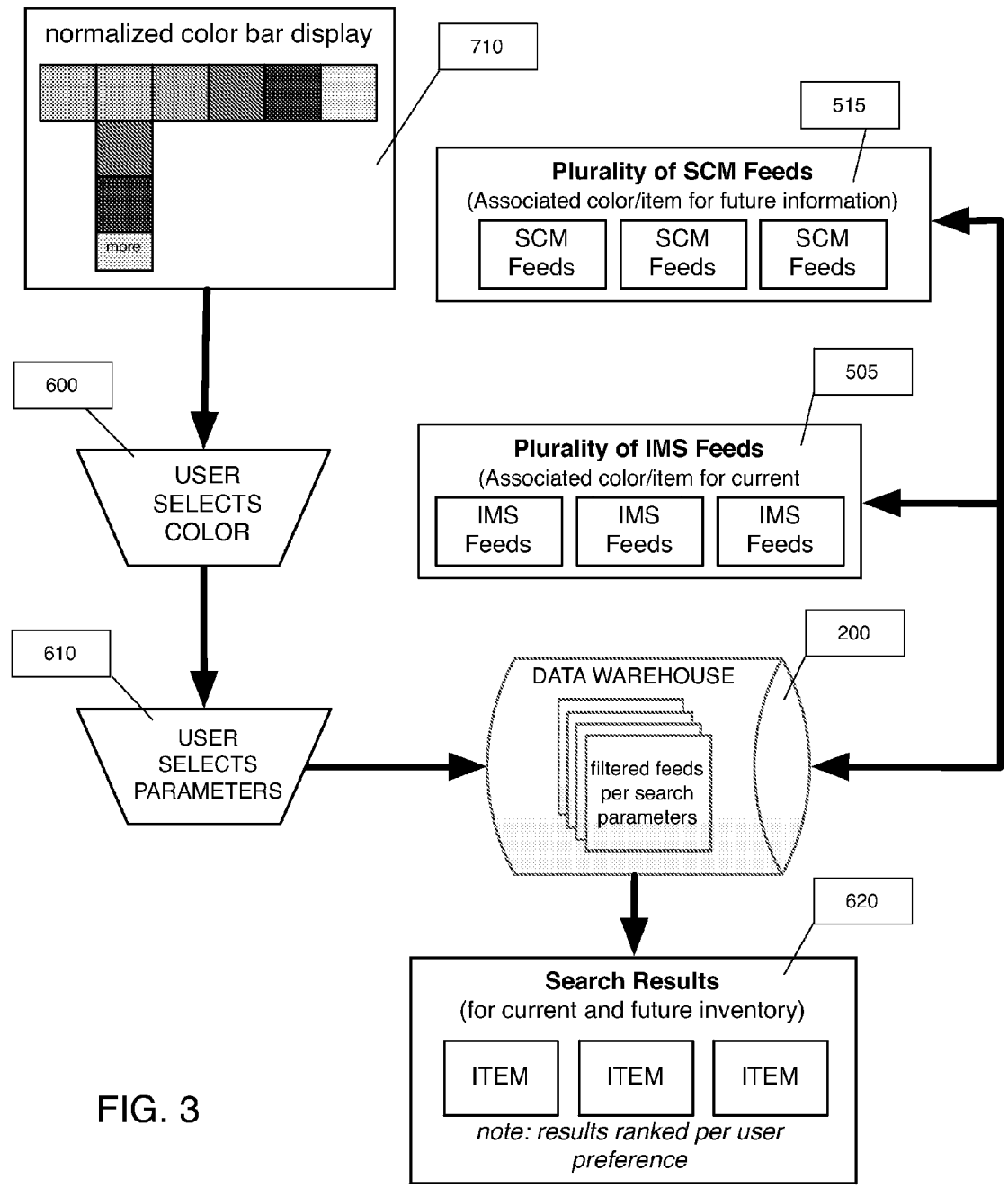
FIG. 3 is an exemplary flow diagram depicting interaction among various system components to perform color based search in accordance with an exemplary embodiment of the claimed invention.
Figure 4:
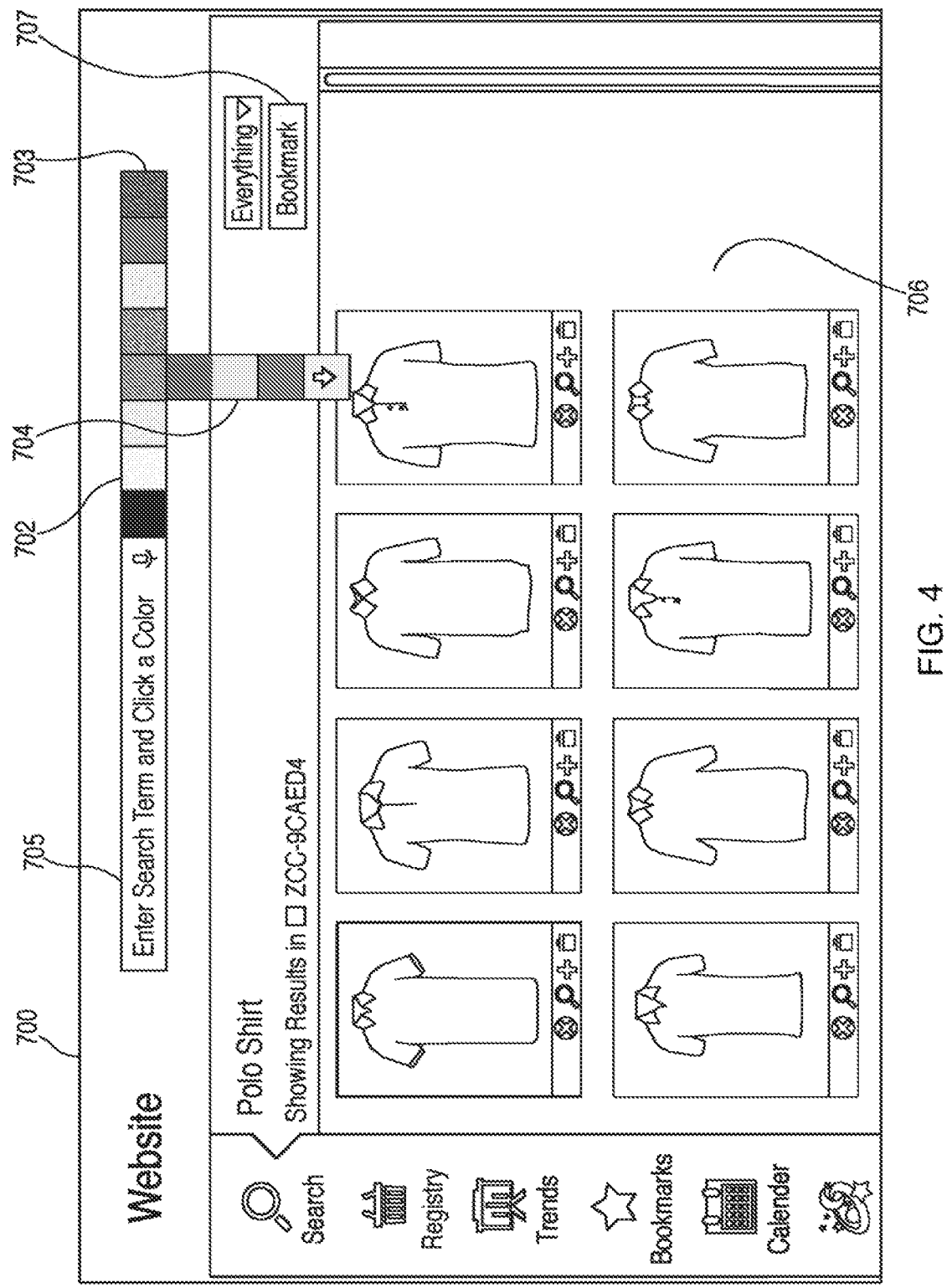
FIG. 4 illustrates an exemplary graphical user interface or display for color search access in accordance with an exemplary embodiment of the claimed invention.

Turning now to FIGS. 3 and 4, all user subscribers (e.g., merchant users, consumer users, etc.) gain entry and access to the server 100 by subscription and by using known security approaches, such as a login and password, which are optionally managed by a separate login server (not shown). Once a login is confirmed and a subscriber is authenticated, the processor 110 of the server 100 loads a user's age, gender, location and other demographic information from the user database 202. The color search engine 120 of the server 100 provides the verified consumer user access to the search query functions via a graphical user interface (GUI) 700 and the processor 110 of the server 100 provides the verified merchant user with access to data available to them under its subscription.

For an unauthorized user or non-licensee of the service provider, when the client device 300 associated with the unauthorized user (i.e., non-subscriber) attempts to access the server 100, in accordance with an exemplary embodiment of the claimed invention, the processor 110 denies the client device 300 access to the server 100 and transmits a registration webpage to the client device 300 so the user can subscribe to the services provided by the service provider and become a registered/authenticated subscriber using any known methods. After completing the registration process, the user has an option of downloading a mobile search application onto her client device 300 to seamlessly and/or automatically connect to the service provider's server 100. In addition or alternatively, the server 100 may permit the client device 300 of the unauthorized user to perform at least one color based search as a teaser to encourage the unauthorized user to become a subscriber and subscribe to the service provider's services.

In accordance with an exemplary embodiment of the claimed invention, the user initiates a color-based search query using the GUI 700 of the color search engine 120 display on the client device 300 associated with the user. By selecting a selectable color area or swatch 702 of the GUI 700, as exemplary shown in FIG. 4, a user initiates a search for products from the data warehouse 200 and/or merchants' IMS systems 500 and/or merchants' SCM systems 510 (collectively and interchangeably referred to herein as the "database engine 250") with the associated digital color codes (e.g., in hexadecimal, RGB, binary) that correspond to the selectable color swatch 702. It should be appreciated that the query or queries sent to the data warehouse 200, to the IMS systems 500 and to the SCM systems 500 (the database engine 250) is referred to herein as a single query for ease of reference. As exemplary shown in FIGS. 3 and 4, when a user desires to search for products of a particular color, the user selects a color from one of the selectable color bar colors that appear on the clickable horizontal color bar 703. Once one of the colors on the horizontal bar 703 is selected, a vertical bar 704 expands downward, typically with shades of the initial color selected on the horizontal color bar 703. Once a user makes a final color selection, which make include one or more colors, the client device 300 transmits a color search criteria 600 to the color search engine 120 of the server 100 over the communications network 400. The color search engine 120 searches the database engine 250 for products matching or closest to the user's final color selection. That is, the color search engine 120 sends the color search criteria 600 in a query to the database engine 250. It is appreciated that each IMS system 500 is associated with a different merchant, retailer, wholesaler, manufacturer and the like, and each SCM system 500 is associated with a different merchant, retailer, wholesaler, manufacturer and the like. It is appreciated that the products can be any goods, including but not limited to apparel, bedding, shoes, hats, ties, socks, scarves, accessories, furniture, appliances, bicycles, cars, paints, lipsticks, hair dyes, make-ups, nail polishes and the like.

In accordance with an exemplary embodiment of the claimed invention, the color search engine 120 searches the database engine 250 for products that meet the color search criteria 600, i.e., the associated digital color code(s) corresponding to the selected color swatch(es) 702. The color search engine 120 transmits the search results 620 containing information about the products matching the user's color search criteria 600 to the client device 300 associated with the user over the communications network. The color search engine 120 stores the color search criteria 600 and the search results 620 in the data warehouse 200. Preferably, the color search engine 120 updates the user color preference history 630 based on the user's color search criteria 600.

However, if no product matching the user's color search criteria 600 is found in the data warehouse 200, the color search engine 120 searches one or more IMS systems 500. Preferably, the color search engine 120 transmits a single query comprising the user's color search criteria 600 to both the data warehouse 200 and the IMS systems 500 to search both of them simultaneously. If no product matching the user's color search criteria 600 is found in the data warehouse 200 and the IMS systems 500, then the color search engine 120 searches the SCM systems 510 to determine if any product matching the user's color search criteria 600 is in the "supply chain" or the "pipeline" (i.e., the matching product is currently being shipped, manufactured, etc.). The color search engine 120 transmits the search results 620 comprising future inventory information, e.g., product availability information, to the client device 300 associated with the user over the communications network 400.

In accordance with an exemplary embodiment of the claimed invention, if no product matching the user's color search criteria 600 is found, then the color search engine 120 returns search results 620 comprising product(s) with nearly the same or closest color to the queried color of the user's color search criteria 600. That is, the color search engine 120 returns product with the hexadecimal code of the universal color system that is nearly the same or closest to the hexadecimal code of the queried color of the user's color search criteria 600. In accordance with the exemplary embodiment of the claimed invention, color search engine 120 of the server 100 executes the following exemplary calculation to determine the closest matching color to the queried color: $c = \sqrt{((r-r_1)^2 + (g-g_1)^2 + (b-b_1)^2)}$, wherein $c$=closest color; $r$=red value of the queried color; $r_1$=red value of the candidate color; $g$=green value of the queried color; $g_1$=green value of the candidate color; and $b$=blue value of the queried color; and $b_1$=blue value of the candidate color. The candidate matching color is the one or more colors that yield the value closest to zero.

Preferences in the color swatches 702 appearing on the color bars 703, 704 may also be controlled and modified via the GUI 700, such as by utilizing the bookmark feature 707. In controlling changes to selectable colors that readily appear on the color bar display 710 of the GUI 700, the color search engine 120 generates user-specific color bar display 710 or 720 based on the user color history, user's purchase history, user's search history and the like. That is, the color search engine 120 displays GUI 700 with the personalized color bar display 720 instead of the normalized color bar display 710 on the client device 300 associated with the user after acquiring sufficient data to determine user's color preferences. Alternatively, the color search engine 120 displays the personalized color bar display 720 when the user clicks on the more button on the normalized color bar display 710. The user selects one or more colors on the normalized color bar display 710 or the personalized color display 720 to search for products in the database engine 250.

In accordance with an exemplary embodiment of the claimed invention, the GUI 700 additionally comprises a textual search field 705 for user to enter additional optional search parameters 610, such as pattern information, e.g., plaid, and textual search criteria, e.g., size, brand, merchant, polo shirt, paint, blender, nail polish, etc. The color search engine 120 searches the database engine 250 for products that meet both the textual search criteria 610 and color search criteria 600 (i.e., the associated digital color codes (e.g., in hexadecimal, RGB, binary) that correspond to the selected color swatch 702. If no additional search parameters 610 are provided by the client device 300, then the color search engine 120 searches the database engine 250 for products that meet only the color search criteria 600, i.e., the associated digital color code(s) corresponding to the selected color swatch(es) 702.

When additional search parameters 610, such as "Polo Shirt" are received from the client device 300 over the communications network 400, in accordance with an exemplary embodiment of the claimed invention, the color search engine 120 provides search results 620 with products or items from the database engine 250 that meet both the color search criteria 600 and textual search criteria 610: a) the hexadecimal color code(s) of the selected color swatch(es) of the color search criteria 600, e.g., hexadecimal code 9CAED4 as exemplary shown in FIG. 4; and b) the textual search parameter or criteria 610, e.g., "Polo Shirt" as exemplary shown in FIG. 4. The color search engine 120 transmits the search results 620 returned by the database engine 250 to the client device 300 over the communications network 400. The client device 300 renders the search results 620 in a display area 706, as exemplary shown in FIG. 4. Although only eight products are shown in the display area 706 in FIG. 4, additional products of the search results 620 can be displayed or brought into the display area 706 by using any know methods, e.g., using a slider on the screen or GUI 700.

In accordance with an exemplary embodiment of the claimed invention, when resources permit, the color search engine 120 queries the database engine 250 continuously and automatically for products with identifying colors that match those colors appearing as selectable color swatches 702 on the user's personalized color bar display 720. The color search engine 120 receives the search results 620 from the database engine 250 and transmits the search results 620 to the client device 300 associated with the user over the communications network 400. The client device 300 populates the display area 706 with the products/items of the search results 620 before the user initiates a formal search. Preferably, the search results 620 comprises products/items from the IMS systems 500 so that the products/items shown in the display area 706 are products/items that are currently available and in stock.

In accordance with an exemplary embodiment of the claimed invention, the user can input additional color search criteria 600 and/or additional textual search criteria 610 into the GUI 700 so the color search engine 120 can narrow or filter the search results 620, for example, to find specific types of products that are currently available for purchase from merchants within the user's current geo-location. These additional parameters or criteria may include, but is not limited to, a second or third color swatch or hexadecimal code, a specific pattern, or a physical attribute, such as size.

In accordance with an exemplary embodiment of the claimed invention, the user can select one or more of the products displayed on the display area 706 for purchase. The client device 300 transmits a purchase request to the server 100 over the communications network 400 when the user selects a product to purchase from the display area 706. The processor 110 may utilize the user's shipping and billing information stored in the user database 202 to process the user's purchase of the product. In addition or alternatively, the processor 110 may lead the user through a series of GUIs displayed on the client device 300 to input the required billing and shipping information to complete the purchase. The GUIs can be either linked through the provider's server 100 or through a merchant's website. The processor 110 stores the purchased products/items 830 as purchase records in the user database 202 and stores de-personalized purchased information in the product database 206, e.g., user's gender and demographic information. The real-time analytics processor 170 may utilize such de-personalized information to determine a common or typical profile of users purchasing such a product or to determine color trends based on gender, age, geo-location and the like. If the purchased product is on the user's wish list 820, then the user module 150 removes or deletes the purchased product from the user's list so that the members of her approved social group 860 is made aware that an item has been purchased from the user's wish list 820, thereby decreasing the likelihood of duplicate purchases. Alternatively, the user module 150 may hide the gift purchases from a user's wish list 820 from the owner of the wish list 820 to keep any gift purchases secret from the owner.

While the embodiments illustrated herein enable a user to search for a plurality of desired colors in one item (e.g., a first color and a secondary color), as well as specific pattern-color combinations (e.g., blue and red plaid), the color search engine 120 can perform other comparable searches on the database engine 250. In accordance with an exemplary embodiment of the claimed invention, the color search engine 120 searches for "complementary" colored items to a queried color or color search criteria 600. Each selectable color swatch 702 in the color bar display 710 and the personalized color bar display 720 is not only associated with a unique hexadecimal code of the universal color system but also is associated with hexadecimal code(s) of one or more complimentary colors. Accordingly, when the user selects to include the complementary color search as additional search parameter or criteria 610 in her search for products, the color search engine 120 searches the database engine 250 for product/items that meet the user's queried color of the color search criteria 600 and the complementary colors associated with the user's queried color. That is, the search results 620 comprises a list or set of products/items satisfying the color search criteria 600 and/or additional textual search criteria 610, and a list of set of product/items satisfying one or more complementary colors associated with the user's queried color. For example, a given shade of blue complements or "go with" all other shades of blue along with a small sample of shades of red, then the search results 620 may additionally comprise lists of products/items satisfying the complimentary shades of blue and red accordingly. The color search engine 120 transmits the search results 620 comprising lists or sets of products satisfying the color search criteria 600 and the complementary colors associated with the queried color to the client device 300 over the communications network 400. In accordance with an exemplary embodiment of the claimed invention, the color search engine 120 selects the complementary colors that are within a predetermined range of the hexadecimal color code of the queried color 600.

In addition or alternatively, the user may select to include the complementary colored item search as additional search criteria 610 in her search for products. The color search engine 120 searches the database engine 250 for product/item to accompany a certain color item. For example, the user may use the color search engine 120 to search for shoes that are complementary to an "olive green" jacket or for curtains that are complementary to a blue and white floral patterned sofa.

In addition to providing the search results 620, in accordance with an exemplary embodiment of the claimed invention, the processor 110 further provides a user with a number of user actions or options to share the product/item on the search results 620 with user's approved social group 860, to add the product/item to the user's wish list 820, to add the product/item to the user's bookmark 840, to add the product/item to the user's deleted list 850 so that the deleted product/item will not be included in any future user's search results 620, and to purchase the product/item. When selections are made by the user, the color search engine 120 stores the user's selections as records in the user database 202. That is, the color search engine 120 stores the shared products/items as social registry records, wish list products/items as wish list records, bookmarked products/items as bookmark records, deleted product/items as deleted records and purchased product/items 830 as purchase records in the user database 202. Additionally, the color search engine 120 conveys the user's selections or records to the real-time analytics processor 170 of the server 100 for processing and analysis. The product recommendation engine 160 utilizes the analyzed data for future recommendations to the user and to others with correlating selections and/or demographics. Thus, information from searches performed by users of available products or merchant inventory is organized and indexed as user data and is used to formulate user preferences that is available to be used for future recommendations to the users providing the data, as well as to other users sharing common user demographics and/or online shopping activities.

Figure 5:
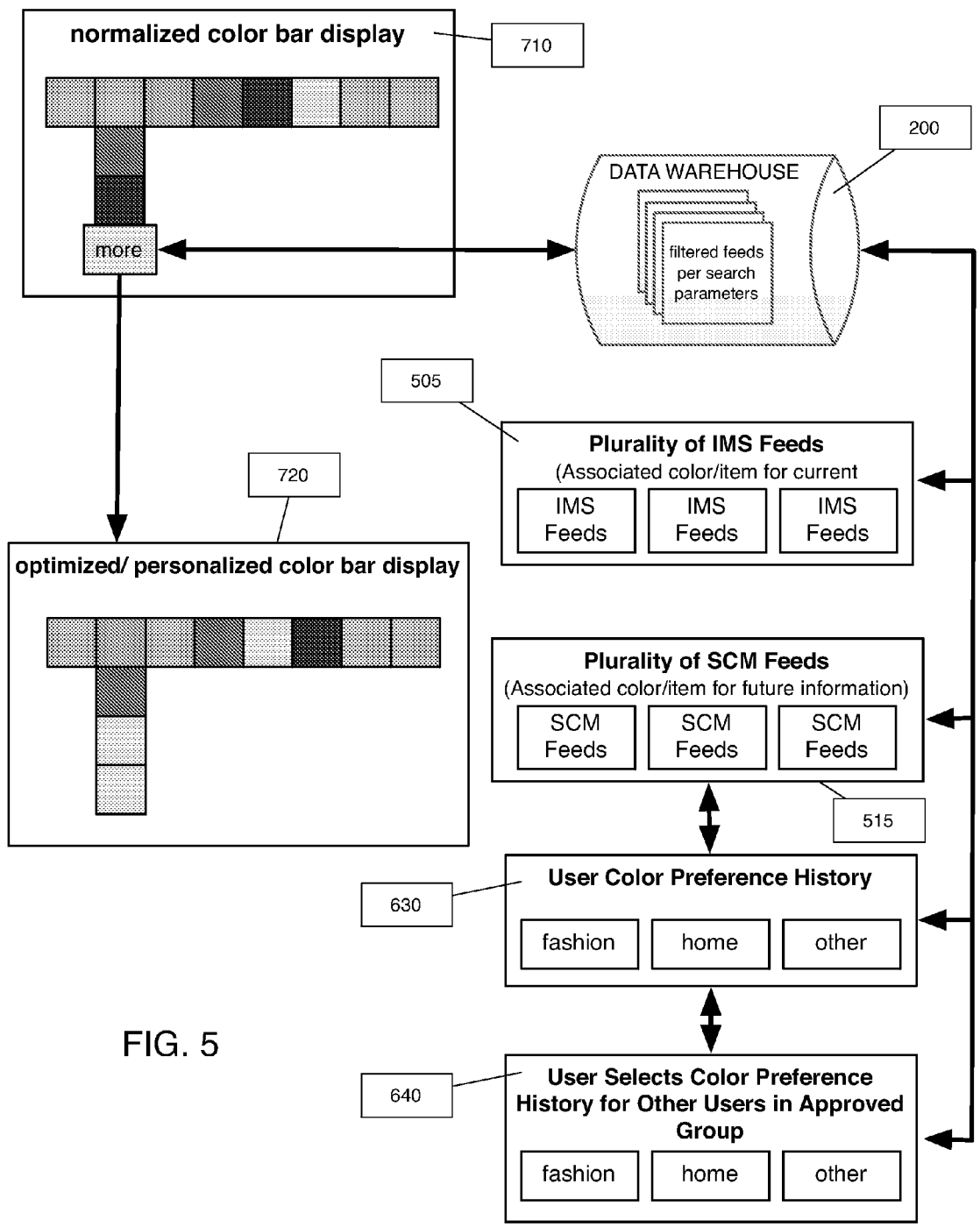
FIG. 5 is an exemplary flow diagram depicting interaction among various system components to perform color based search in accordance with an exemplary embodiment of the claimed invention.

In accordance with an exemplary embodiment of the claimed invention, the color search engine 120 performs product/items searches using the color and/or pattern preferences of the user stored in the user database 202. The user module 150 updates the user's color and pattern preferences (collectively referred to herein as the "user color or preference history 630") based on one or more of the following: the user's search criteria 600, 610; and user's selection of a particular product/item to share with user's approved social group 860, to add to user's wish list 820, to add to the user's bookmark 840, or to purchase. Preferably, the user module 150 categorizes user color preference history by product type, e.g., fashion, home, etc., as exemplary shown in FIG. 5.

Figure 6:
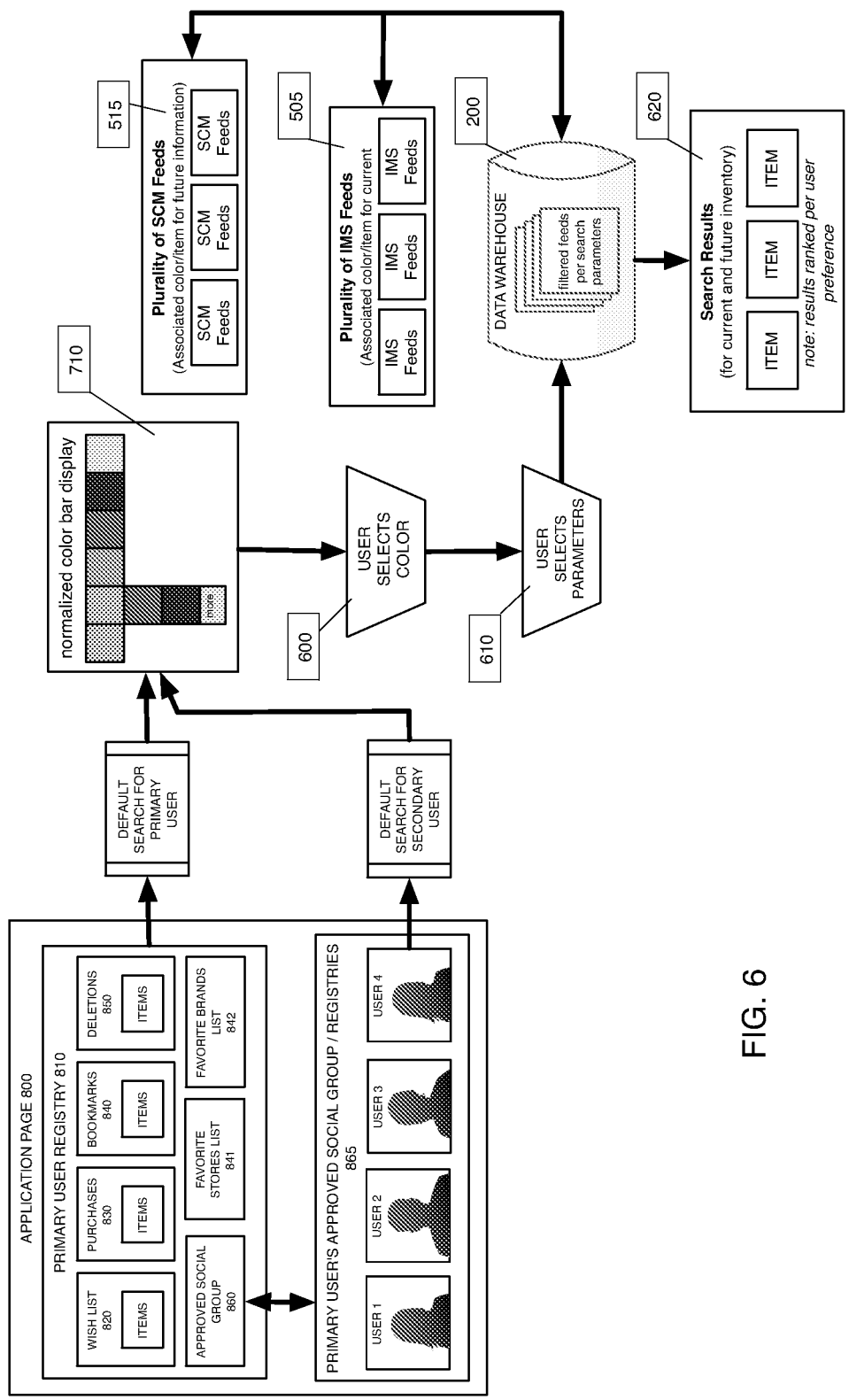
FIG. 6 illustrates an exemplary user registry page and an exemplary flow diagram depicting interaction among various system components to perform color based search for primary and secondary users in accordance with an exemplary embodiment of the claimed invention.

In accordance with an exemplary embodiment of the claimed invention, as exemplary shown in FIGS. 4 and 6, when the client device 300 associated with the subscriber (i.e., a registered user) access the server 100, the processor 100 transmits an application page or GUI 800 to the client device 300. The client device 300 displays the application page 800 comprising the subscriber's or primary user registry GUI 810. In accordance with an exemplary embodiment of the claimed invention, the primary user registry GUI 810 comprises one or more following exemplary selectable or clickable GUIs displaying: product/items on the user's wish list 820, the purchase list 830 of the products/items purchased by the user, products/items on the user's bookmark 840, products/items on the user's deleted list 850, user's approved social groups 860, user's favorite stores list 841 and user's favorite brands list 842. When the user clicks or selects the approved social group GUI 860, the processor 110 displays expanded GUI 865 with photos or identifier (e.g., username, nick name, etc.) of various members of the user's approved social group/registries.

In accordance with an exemplary embodiment of the claimed invention, as exemplary shown in FIG. 6, the color search engine 120 automatically performs default searches for products based user color preference history 630 and/or the user's personalized color bar display 720, preferably each time the user color preference history 630 and/or user's personalized color bar display 720 is updated. When the client device 300 associated with the subscriber access the GUI 700 to initiate a color-based search query, the color based engine 120 transmits the search results 620 returned by the database engine 250 in response to the default search to the client device 300 over the communications network 400. The client device 300 renders the received search results 620 in the display area 706, as exemplary shown in FIG. 4.

In accordance with an exemplary embodiment of the claimed invention, as exemplary shown in FIG. 6, the color search engine 120 automatically performs default searches for products based on each approved social group member's color preference history 640 and/or each member's personalized color bar display 720, preferably each time the member's color preference history 640 and/or member's personalized color bar display 720 is updated. When the client device 300 associated with the subscriber access the GUI 700 to initiate a color-based search query for a member of the user's approved social group 860 (i.e., a secondary user), the color based engine 120 transmits the search results 620 returned by the database engine 250 in response to the default search for the secondary user to the client device 300 over the communications network 400. The client device 300 renders the received search results 620 in the display area 706, as exemplary shown in FIG. 4.

Figure 7:
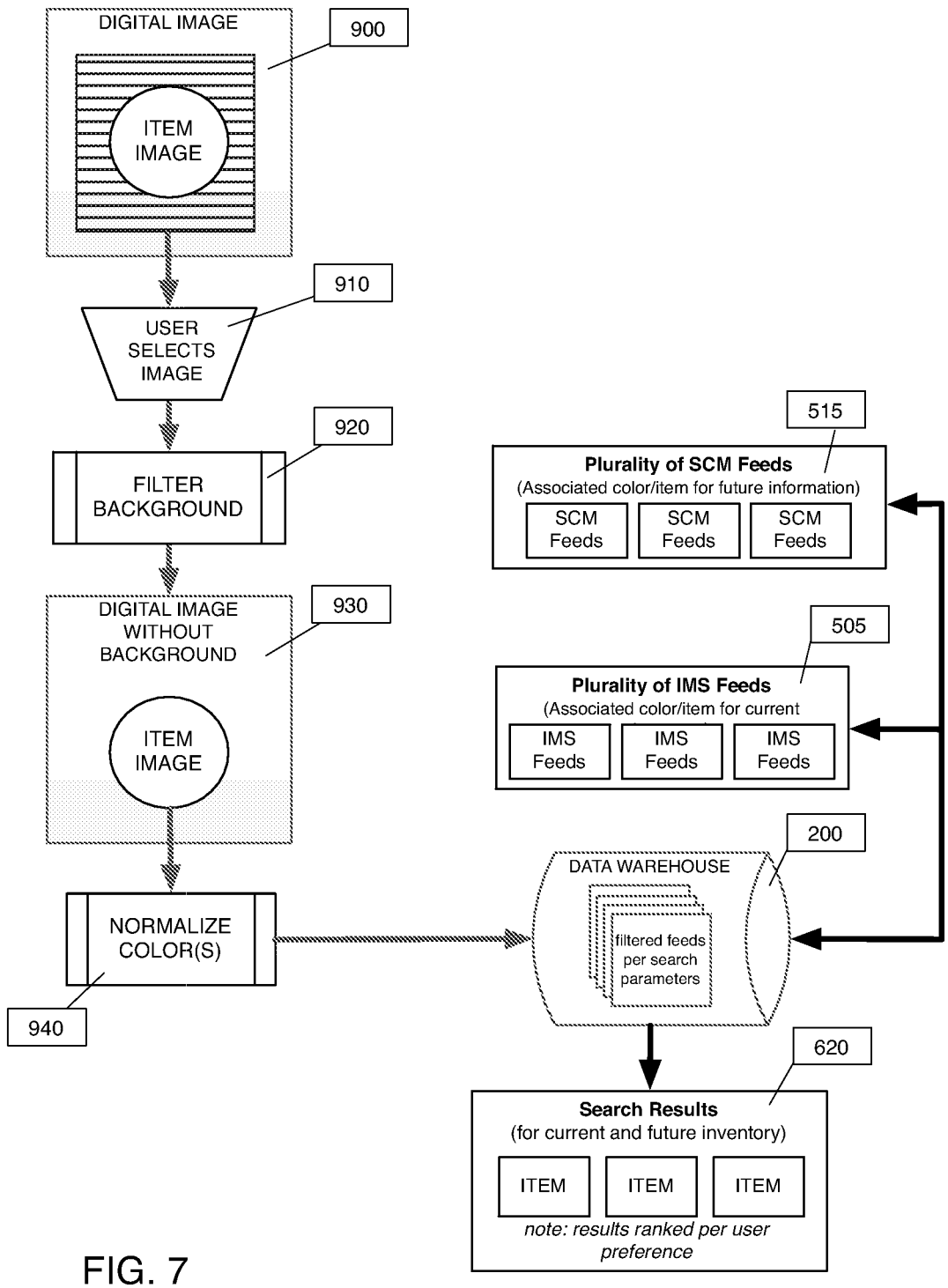
FIG. 7 is an exemplary flow diagram depicting interaction among various system components to perform color based search based on a digital image of the product/item in accordance with an exemplary embodiment of the claimed invention.

In accordance with an exemplary embodiment of the claimed invention, as exemplary shown in FIG. 7, the client device 300 transmits a selected digital image 910 of the product/item to the server 100 over the communications network 400 to search the database engine 250 for products/items matching or similar to the digital image 910. The client device 300 can be a web enabled device 300, e.g., a Smartphone 300 with a built-in camera 310, a tablet 300 with a built-in camera 310, a laptop 300 with a built-in camera 310, etc., and the selected digital image 910 may be an image 900 downloaded from Internet, a photo 900 of a product/item taken with the client device's built-in camera 310, an image 900 received via email text, and the like, or an image 900 stored in the memory of client device 300.

In accordance with an exemplary embodiment of the claimed invention, the processor 320 of the client device 300 normalizes and codifies colors from one or more selected digital images 910 of the product/item selected by the user into a universal color system. The client device 300 transmits the universal color code(s) associated with the selected digital image 910 to the server over the communications network 400 via the network connection facility 350. As described more fully in applicant's '557 application and as exemplary shown in FIGS. 8*a*-8*g* and 9, in accordance with an exemplary embodiment of the claimed invention, the processor 320 of the client device 300 performs a "mobile" or "light" version of the full normalization process 940 performed by the server 100. In addition or alternatively, the processor 320 of the client device 300 may perform none of the normalization process 940 and rely entirely on the server 100. That is, the client device 300 may transmit the selected digital image 910 to server 100 to identify the dominant colors and normalize the selected digital image 910. It is appreciated that this does not necessarily preclude the client device 300 with a more powerful processor 320 and a larger memory 330 from performing the full normalization process 940 as preformed by the server 100.

As described more fully in applicant's '557 application and as exemplary shown in FIGS. 8a-8g and 9, in accordance with an exemplary embodiment of the claimed invention, the processor 320 of the client device 300 or the image processor 180 normalizes and codifies colors and patterns from one or more selected digital images 910 of the product/item received from the client device 300 into the universal color system, thereby enabling the color search engine 120 to find products/items in the database engine 250 matching and/or similar the product shown in the selected digital image 910. As exemplary shown in FIGS. 8a-8g and 9, the processor 320 or the image processor 180 receives a digital image 910 of a shirt with patterns for processing and recognition at step 1000. In the full normalization process 940, the image processor 180 performs the steps 1010-1070. For the mobile normalization process, the processor 320 or the image processor skips the steps 1020-1040 shown in FIG. 9. The processor 320 or the image processor 180 isolates or extracts the relevant product pattern and color from the rest of the image, with the irrelevant portion of the image 920 being deemed background or "whitespace" 920 and discarded to provide a filtered image 930 at step 1010. The processor 320 or the image processor 180 scans the filtered image 930 for proximity pixels at step 1020 and defines proximity points at step 1030. Once the proximity points are defined, at step 1040, the processor 320 or the image processor 180 searches the filtered image 930 for a repeat pattern in the product-utilizing pattern repeat parameters defined in the color database 208. Depending on the extent of pattern distortion of the product appearing in the filtered image 930, the processor 320 or the image processor 180 further subdivides the filtered image 930 until it can identify and determine the repeat pattern of the product.

In accordance with an exemplary embodiment of the claimed invention, the processor 320 or image processor 180 compares the repeat pattern to the predefined set of patterns stored in the color database 208 to classify or determine the product pattern. Once the pattern is classified, the processor 320 or the image processor 180 categorizes or determines the prevalent or dominant colors of the product at step 1050. The processor 320 or the image processor 180 codifies or converts the identified colors into the hexadecimal codes/values of the universal color system and preferably, lists the identified colors by its prevalence or frequency (i.e., the number of times a particular color appears in the product image), as exemplary shown in FIG. 8g, at step 1060. For example, the processor 320 or the image processor 180 can identify the following five dominant colors represented by their universal hexadecimal values CB93B1, BDCADC, C3AECD, E3CFCD and EFEBE2. After all of these colors and the pattern are identified, the processor 320 or the image processor 180 associates the identified colors and/or patterns with this particular shirt and stores these codified color and pattern data as the color search criteria 600 and additional search criteria 610 in the memory 330 or the data warehouse 200 at step 1070. If the mobile normalization process on the selected digital image 910 was performed by the processor 320, the client device 300 transmits the codified color data of the selected digital image 910 (i.e., the identified hexadecimal color code(s) associated with the selected digital image 910) to the server 100 over the communications network 400 for analysis and processing.

Figure 8:
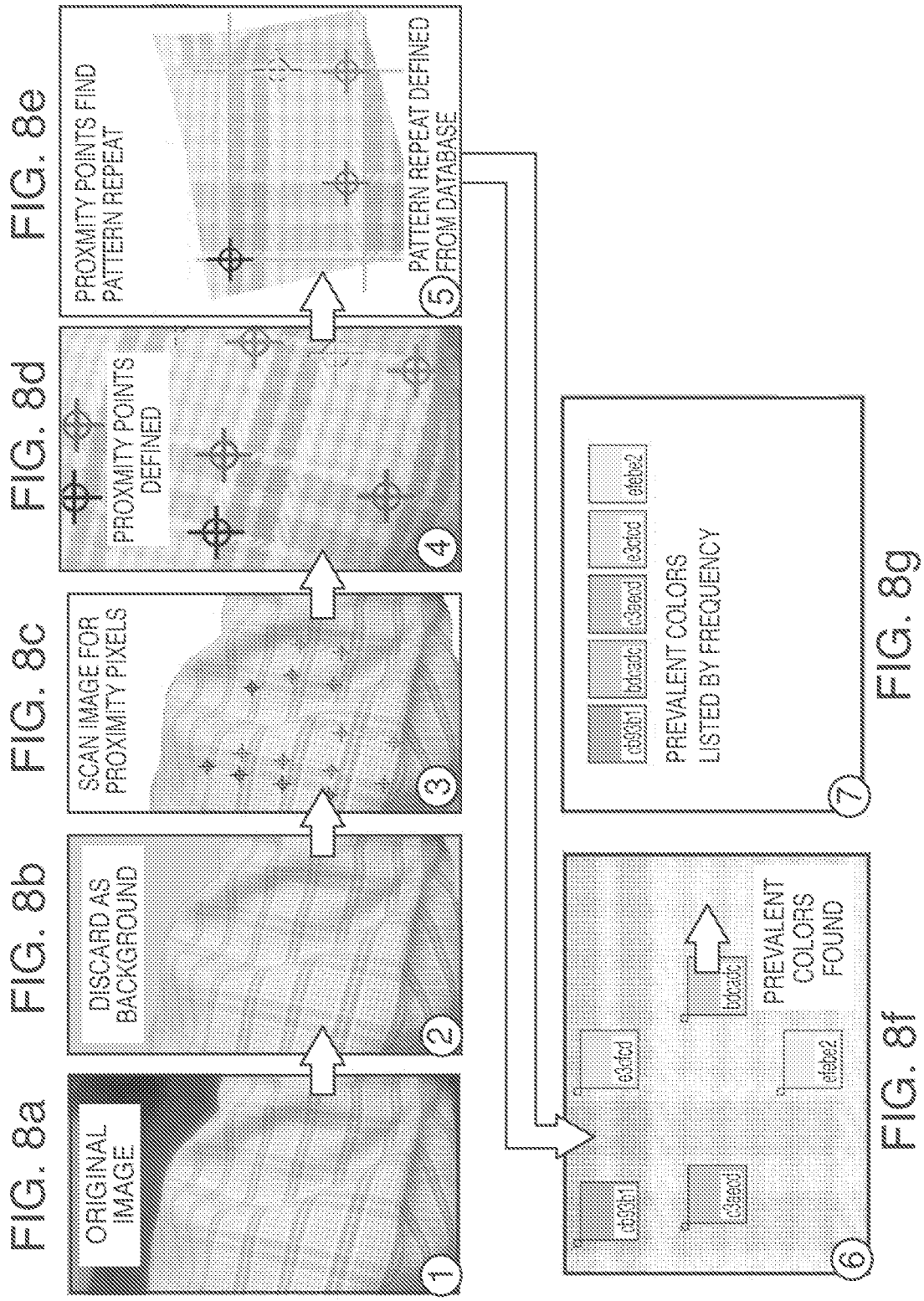
FIGS. 8a through 8g illustrate an exemplary process for identifying and recognizing color(s) and/or pattern(s) from a image of a striped shirt pattern by the image analytics processor in accordance with an exemplary embodiment of the claimed invention.
Figure 9:
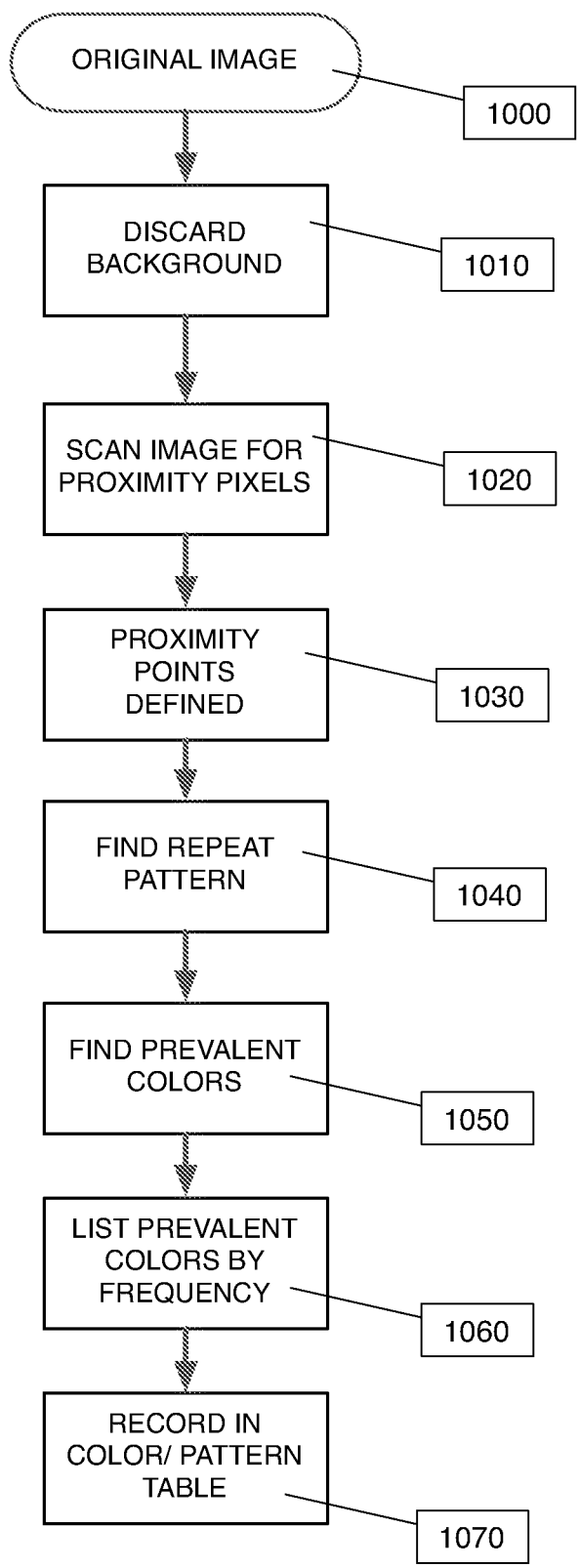
FIG. 9 is a flow chart depicting an exemplary process for identifying and recognizing color(s) and/or pattern(s) by the image processor in accordance with an exemplary embodiment of the claimed invention.

When analyzing patterns of multiple colors such as the one shown in FIG. 8a, the processor 320 or the image processor 180 identifies colors by sampling selected spots in a given region of the filtered image 930. When the sampling indicates that more than one color might exist, the processor 320 or the image processor 180 further samples and/or further subdivides the filtered image 930, and may continue the process iteratively until only one color is identified in the subdivision or the image subdivision is reduced to a single pixel. In accordance with an exemplary embodiment of the claimed invention, the processor 320 or the image processor 180 selects the sizing or subdivisions based on the number of colors identified in a region, the deviation of values of the colors in a region (as compared to a predetermined range or threshold), or some other criteria. The processor 320 or the image processor 180 analyzes each region's color values, for example on a pixel-by-pixel basis. In addition, the image processor 180 stores each sampled location of each region by its X, Y coordinates relative to the entire filtered image 930 (together with its color values), and each region is assigned one or more color values based on the color determination. Further, the processor 320 or the image processor 180 searches for pattern(s) in the filtered image 930. The processor 320 or the image processor 180 can recognize a change in color when a certain parameter changes by more than a fixed threshold, such as 15%. As a result, the processor 320 or the image processor 180 can built a virtual map which depicts colors in positions to indicate where color changes occur and, in aggregate, a pattern can emerge. By identifying each region's color and the location of each region relative to the entire filtered image 930, the processor 320 or the image processor 180 can determine patterns, for example, using pixel geometry techniques that are known in the art. Once the patterns and colors are determined, the processor 320 or the image processor 180 assigns identifying numerical values, preferably hexadecimal code of the universal color system, to the selected product/item image 910. The color search engine 120 then utilizes the hexadecimal code assigned to the selected product/item image 910 by the image processor 180 as color search criteria 600 and the pattern classified/identified in the selected product/item image 910 by the image processor 180 as the additional search criteria 610 to search the database engine 250 for matching and similar products.

In accordance with an exemplary embodiment of the claimed invention, the color search engine 120 ranks the search results 620 or arranges the search results 620 in an ordered list from most relevant to least relevant, e.g., the products/items with color hexadecimal code closer to the queried color is considered more relevant and is presented higher in the search result ordering. The color search engine 120 transmits the ranked or ordered search results 620 to the client device 300 over the communications network 400 such that the client device 300 displays the search results 620 in the display area 706 from most relevant to least relevant. In addition or alternatively, the color search engine 120 may consider other factors, such as user preference, product availability, merchant or user ratings, in determining the ordered search results 620, i.e., relevancy of the products/items on the search results 620.

In accordance with an exemplary embodiment of the claimed invention, the user may view, rate, store, purchase, or discard the products/items on search results 620 displayed on the display area 706 of the client device 300. The user module 150 maintains a browsing history for each user in the user database 202 and adds/keeps a product/item viewed by the user in the user's browsing history. That is, for example, if the user views a product in the user's search results 620, the user module 150 adds the product to a listing of the user's browsing history stored in the user database 202. It is appreciated that the user make changes to her stored browsing history at any time. For example, if an item is of no interest to the user, the user may delete that item from her browsing history. In accordance with an exemplary embodiment of the claimed invention, a user may specify that a particular search is personal, the color search engine 120 will not make such search result 620 available to anyone other than the user. That is, the color search engine 120 does not make that particular search result 620 available to the user's approved social group 860. If the user's search for product is for another person, e.g., a gift search for her spouse, the color search engine 120 may not make the search results 620 available to her spouse, but may make it available to other members of the approved social group 860. The user module 150 segments out the browsing information from the user's browsing history for any searches made for another person by the user to provide a more accurate user-specific browsing information.

In accordance with an exemplary embodiment of the claimed invention, a user may rate the products to indicate a level of interest (e.g., of no interest, of little interest, of great interest). The processor 110 or the user module 150 stores the user rating, whether it be according to a phrase (e.g., "of no interest"), or according to a numerical scale, as a numerical value associated with that product in the product database 206. The product recommendation engine 160 may utilize the user rating information to recommend products to members of the user's preapproved social group 860 or other users of the claimed system.

If a user wants to delete any rating or does not want the processor 110 to store a viewed product in a browsing history stored in the user database 202, the user may select to discard any data associated with the viewed product. Should a user select to discard any data associated with the viewed product, the processor 110 or the user module 1250 will either store no data or delete any data stored associated with the viewed product from the user database 202 or it will be stored that the user selected to delete the product from her profile.

In accordance with an exemplary embodiment of the claimed invention, the user can add one or more of the products displayed on the display area 706 to the user registry 810, e.g., to the user's wish list 820, or to the registry 810 of a member of user's approved social group 860. The registry module 140 allows a user to store, share, and edit a listing of products, such as a wish list 820 or other registry of products. A user may select to save a selected product to a listing of products, such as a wish list 820. A user and her members of her approved social group 860, if permission is granted by the user, can view any saved listing by accessing the registry module 140 over the communications network 400 using her client device 300.

The client device 300 transmits a registry add request to the server 100 over the communications network 400 when the user selects a product to add to her registry 810 from the display area 706. The registry module 140 adds the selected product to the user's registry 810 stored in the user database 202 or to the registry 810 of a member of the user's approved social group 860. The registry module 140 further stores de-personalized product registry information in the product database 206, e.g., gender and demographic information of user showing interest in a product. The real-time analytics processor 170 may utilize such de-personalized information to determine a common or typical profile of users showing an interest in such a product.

In accordance with an exemplary embodiment of the claimed invention, the registry module 140 allows a user to share with another user (e.g., members of her approved social groups 860) all or partial information stored for that user in the user database 202. Amount of information to be shared with members of her approved social groups 860 can vary by group, e.g., user may elect to share more information with a group of her friends than a group of her work colleagues. The user may wish to share some of her user data (e.g., name, birthday, demographic data, and color preference information) with members of her approved social group 860. This will allow any members of her approved social group 860 to not only see the saved listings of products, but also any other information selected by the user to share with her approved social group 860, such as user's browsing history, product ratings, calendar, color preferences, personal information, favorite brands list 842, favorite store list 841, etc. In this manner, members of the user's social group 860 may see that a certain event, such as the user's birthday or anniversary, is occurring and may view her wish list 820 to purchase an appropriate gift for the user.

In accordance with an exemplary embodiment of the claimed invention, a first user may request to share specified information with that second user. Once a second user accepts that request, the first user and the second user may share all or parts of their user data, product data and/or color data stored in the data warehouse 200 with each other and each may associate that second user with a certain contact grouping 860. By way of example, a contact grouping may be friends, family, romance, work, etc. The registry module 140 stores each accepted request and associated contact grouping or social group 860 in the user database 202 and links the social group to the stored user data.

As exemplary shown in FIG. 6, the registry module 140 provides or displays the user profile information, social groups 860, wish list 820, purchase list 830, bookmarks 840, browsing history, etc. for viewing by the user on the application page 800 displayed on the client device 300. The processor 110 transmits a primary user registry GUI 810 to be displayed within the application page or GUI 800 to the client device 300 over the communications network 400. The primary user registry GUI 810 allows a user to access the registry module 140 to browse her contact or social groups 860, to examine other user information, such as birthday information, and to shop for items that another user in the approved social group 860 has posted on her wish list, browsing history, or purchase history. Furthermore, because the profile information of other users is available, the registry module 140 allows the user to set reminders for other users in the social group 860, such as a birthday or other event reminders.

In accordance with an exemplary embodiment of the claimed invention, the user module 150 and/or registry module 140 present various GUIs on the client device 300 for the user to enter information regarding the user (such as birth date) and to identify affinity or social groups 860 and members of affinity groups (such as friends, family, etc.) The user data may include a photograph and any user input for creating a user profile and/or color profile, and is stored in the user database 202. The registry module 140 may display a sliding GUI 865 of people in the user's affinity or social group 860 with photos or identifier (e.g., username, nick name, color preferences, etc.). In accordance with an exemplary aspect of the claimed invention, when the primary user clicks on the photo or identifier of a member of user's social group 860, e.g., user 3 displayed on the sliding GUI 865 in FIG. 6, the registry module 140 connects the primary user's client device 300 with the client device 300 of the user 3 over the communications network 400 so that the primary user can communicate with user 3 via text, email, voice and/or video.

In accordance with an exemplary embodiment of the claimed invention, the user module 150 stores user's calendar as user data in the user database 202, as well as events, e.g., birthday, anniversary, etc., and reminders. The user module 140 enables the user to connect past event information to her profile. The registry module 140 may link the past event information to user data stored in the user database 202, including event descriptions, event date information, event photographs, and event videos, such that other users who are connected to that user may view the event.

Figure 10:
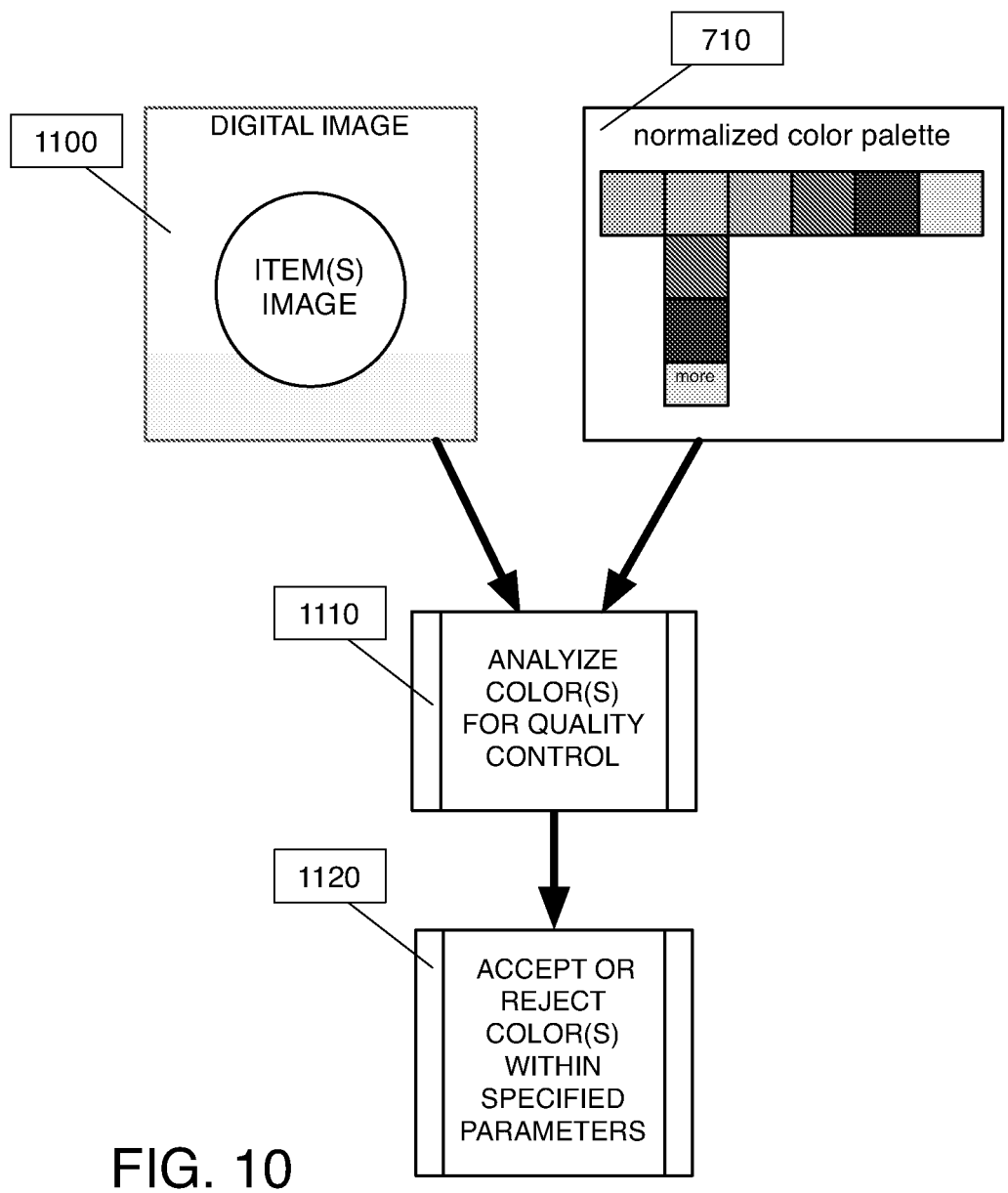
FIG. 10 is an exemplary flow diagram depicting an exemplary process for analyzing colors for quality control in accordance with an exemplary embodiment of the claimed invention.
Figure 11:
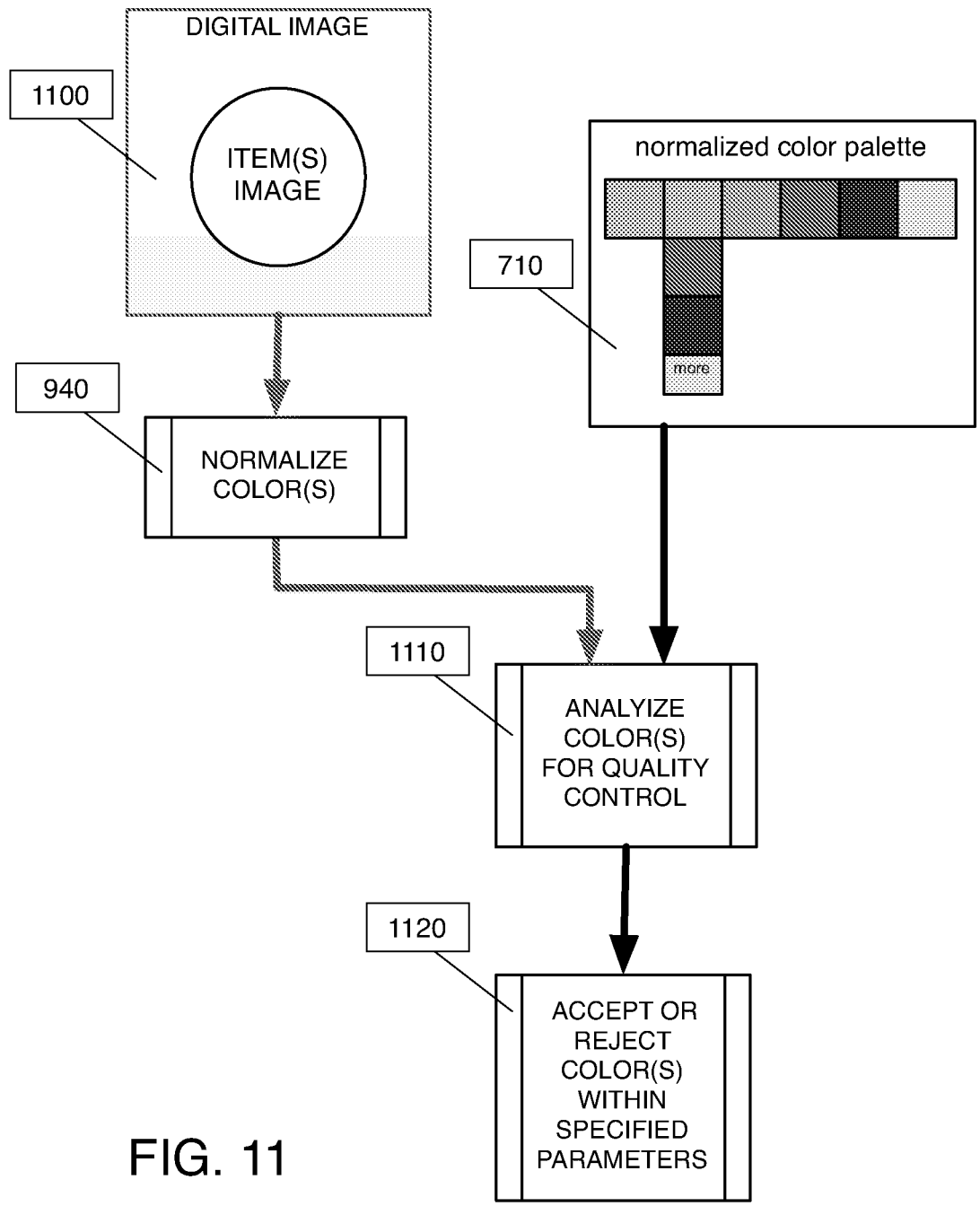
FIG. 11 is an exemplary flow diagram depicting an exemplary process for analyzing colors for quality control in accordance with an exemplary embodiment of the claimed invention.
Figure 12:
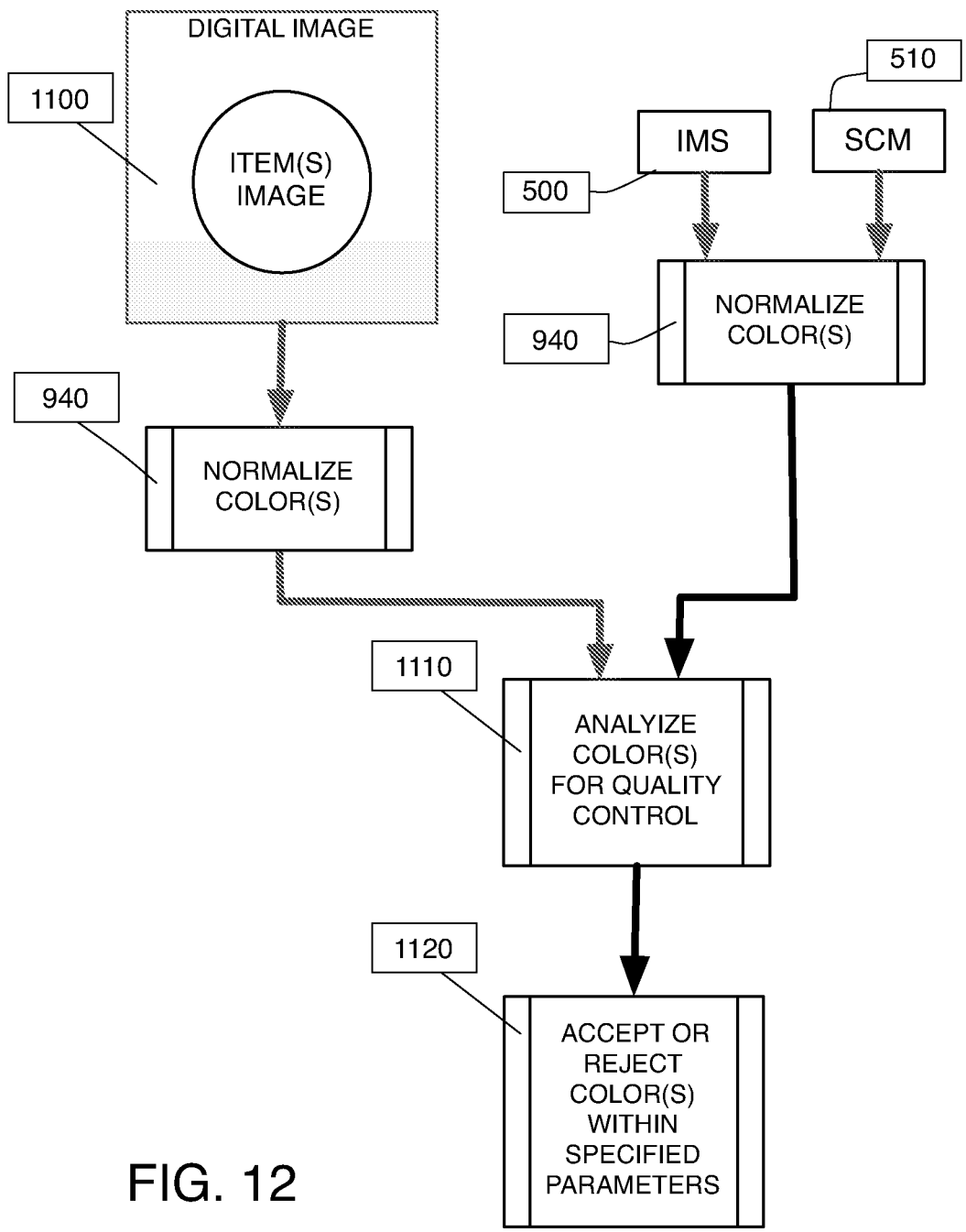
FIG. 12 is an exemplary flow diagram depicting an exemplary process for analyzing colors for quality control in accordance with an exemplary embodiment of the claimed invention.

In accordance with an exemplary embodiment of the claimed invention, as exemplary shown in FIGS. 10-12, the claimed invention may be utilized for quality control, e.g., to ensure that manufacturer has produced the goods in correct color. That is, as exemplary shown in FIG. 11, the client device 300 associated with the user transmits a color digital image 1100 of the product, e.g., a green shirt supposedly having the universal color code "11ff66," to the server 100 for verification or quality control over the communication network 400. The user utilizes its client device 300, such as a web enabled device 300, e.g., a smart phone 300 with a built-in camera 310, a tablet 300 with a built-in camera 310, a laptop 300 with a built-in camera 310, etc., to obtain a photo or digital image 1000 of a product/item and stores the captured image in the memory 330 of the client device 300. In addition or alternatively, the client device 300 may receive the digital image 1100 via email text, and the like, or retrieve the image 1100 from the memory 330 of the client device 300.

In accordance with an exemplary embodiment of the claimed invention, the processor 320 of the client device 300 normalizes and codifies colors from one or more digital images 1100 of the product/item selected by the user into the universal color system. The client device 300 transmits the universal color code(s) associated with the digital image 1100 to the server over the communications network 400 via the network connection facility 350. As described more fully in applicant's '557 application and as exemplary shown in FIGS. 8a-8g and 9, in accordance with an exemplary embodiment of the claimed invention, the processor 320 of the client device 300 performs a "mobile" or "light" version of the full normalization process 940 performed by the server 100. In addition or alternatively, the processor 320 of the client device 300 may perform none of the normalization process 940 and rely entirely on the server 100. That is, the client device 300 may transmit the digital image 1100 to server 100 to identify the dominant colors. It is appreciated that this does not necessarily preclude the client device 300 with a more powerful processor 320 and a larger memory 330 from performing the full normalization process 940 as preformed by the server 100.

In accordance with an exemplary embodiment of the claimed invention, as exemplary shown FIGS. 8a-8g and 9-12, the processor 320 of the client device 300 or the image processor 180 of the server 100 receives a digital image 1100 of a shirt with patterns for processing and recognition at step 1000. In the full normalization process 940, the image processor 180 performs the steps 1010-1070. For the mobile normalization process, the processor 320 or image processor 180 skips the steps 1020-1040 shown in FIG. 9. Since both the mobile normalization and full normalization process 940 has already been described herein, the discussion will not be repeated here.

After the colors have been identified, the processor 320 or the image processor 180 associates the identified colors with this particular digital image 1100 and stores these codified color data in the memory 330 or the data warehouse 200 at step 1070. In the case where the mobile normalization process is performed by the processor 320, the client device 300 transmits the codified color data of the digital image 1100 (i.e., the identified hexadecimal color code(s) associated with the digital image 1100) to the server 100 over the communications network 400 via the network connection facility 350 for analysis and processing 1110.

For an authorized merchant user or licensee of the service provider, the user has access to the normalized or personalized color bar display 710, 720 on its client device 100 to select the color(s) 702, 703 of the product/item ordered from the manufacturer, e.g., a green shirt having the universal color code "11ff66" in this hypothetical example. The selection of colors for quality control by the merchant user is similar to the selection of colors by the consumer/merchant user for initiating color-based search query as described herein. The client device 300 transmits the color code "11ff66" of the product/item ordered or to be produced/manufactured by the manufacturer to the server 100 over the communications network 400. The processor 110 of the server 100 compares/analyzes the universal color code of the digital image 1100 (i.e., the color of the manufactured item) received from the client device 300 or determined by the image processor 180 to the universal color code associated with the color of the ordered product/item received from the client device 300. The processor 110 of the server 100 either determines whether the universal color code of the digital image 1100 of the manufactured product/item matches or is within a predetermined parameters or threshold 1120, which may be established by the merchant or the service provider, of the universal color code of the ordered product/item. That is, the processor 110 determines if the color of the manufactured product/item matches or is within the predetermined range or threshold of the color of the ordered item. The processor 110 transmits an accept message to the client device 300 over the communications network 400 if the color of the manufactured product/item matches or is within the predetermined threshold 1120. In the hypothetical example 2, where the universal color code of manufactured product/item is "11ff55," the processor 110 transmits an accept message to the client device 300 because the color of the manufactured product/item is within the predetermined threshold 1120. That is, the color of the manufactured product/item is accepted because it is very similar to the color of the ordered product/item. However, the processor 110 transmits a reject massage to the client device 300 over the communications network if the manufactured product/item does not match or is not within the predetermined threshold 1120. In the hypothetical example 1, where the universal color code of manufactured product/item is "11ffcc," the processor 110 transmits a reject message to the client device 300 because the color of the manufactured product/item is not within the predetermined threshold 1120. That is, the color of the manufactured product/item is rejected because it is different from the color of the ordered product/item.

For an unauthorized merchant user or non-licensee of the service provider, when the client device 300 associated with the unauthorized merchant user (i.e., non-subscriber) attempts to access the server 100, in accordance with an exemplary embodiment of the claimed invention, the processor 110 denies the client device 300 access to the server 100 and transmits a registration webpage to the client device 300 so the user can subscribe to the services provided by the service provider and become a registered/authenticated subscriber using any known methods. After completing the registration process, the user has an option of downloading the mobile normalization process application onto her client device 300 to perform normalization and codification of the digital images 1100 locally on her client device 300. In addition or alternatively, the server 100 may permit the client device 300 of the unauthorized merchant user to transmit digital image or data associated with the ordered product/item to the server 100 for normalization and codification. As exemplary shown in FIG. 12, the image processor 180 performs either mobile or full normalization process 940 on both the digital image 1110 of the manufactured product/item and the image/data of the ordered product/item received from the client device 300 to identify the universal color code(s), preferably, the color hexadecimal code(s), of the of the manufactured product/item and ordered product/item. It is appreciated that the image/data of the ordered product/item may be from the merchant's IMS system 500 or SCM system 510. The processor 110 then compares/analyzes the universal color codes of the manufactured product/item and ordered product/item to determine if the color of the manufactured product/item matches or is within predetermined threshold of the color of the ordered product/item, similar to the process for the authorized merchant users.

The accompanying description and drawings only illustrate several embodiments of a system, methods and interfaces for color-based identification, searching and matching, however, other forms and embodiments are possible. Accordingly, the description and drawings are not intended to be limiting in that regard. Thus, although the description above and accompanying drawings contain much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments may be practiced by those of ordinary skill in the art without departing from the spirit and scope of the invention.

The invention claimed is:

1. A computer based method for searching and matching products based on color using a universal color system, comprising the steps of:
   receiving a color-based search query comprising user's color selection from a processor based client device associated with a user by a processor based server over a communications network, the user's color selection comprising at least one hexadecimal color code of the universal color system;
   searching a database engine by a color search engine of the server for products having the hexadecimal color codes within a predetermined range of the hexadecimal color code of the user's color selection to provide a search result, the database engine comprising a plurality of products from a plurality of merchants, each product being previously normalized and codified in accordance with the hexadecimal color codes of the universal color system by extracting image data comprising a plurality of product images from a normalized data feed, segmenting each product image into a plurality of segments, analyzing each segment of said each product image to determine a dominant color for said each segment, determining at least one dominant product color for said each product image based on prevalence of said at least one dominant product color in said each segment, converting said at least one dominant product color for said each product image to a digital value of the universal color system based on color component intensity values, and assigning a hexadecimal color code of the universal color system that is closest to the digital value of said each product image;
   transmitting the search result to the client device associated with the user by the color search engine over the communications network;
   storing the user's color selection and the search result in a database; and
   updating color preference history of the user in the database.

2. The method of claim 1, wherein the step of searching for matching products comprises the step of searching at least one of the following by the color search engine: a data warehouse maintained by a service provider, inventory management systems of a plurality of merchants and supply chain management systems of a plurality of merchants.

3. The method of claim 2, further comprising the step of filtering the search result based on an availability of the products from the inventory management systems.

4. The method of claim 3, further comprising the step of ranking the products on the search results based on their availability from merchants within the user's current geo-location.

5. The method of claim 3, further comprising the step of searching the supply chain management systems for products available in a future date matching the user's color selection if no products are currently available from the inventory management systems having the hexadecimal color code that is within the predetermined range of the hexadecimal color code of the user's color selection.

6. The method of claim 1, further comprising the step of ranking the products on the search result based on their hexadecimal color codes, a product having the hexadecimal color code closer to the hexadecimal color code of the user's color selection being ranked higher than a product having the hexadecimal color code further from the hexadecimal color code of the user's color selection.

7. The method of claim 1, further comprising the steps of receiving textual search criteria from the client device by the server over the communications network, the textual search criteria comprising at least one of the following: product description, product availability, size information, merchant information, product category, brand information, pattern information, complementary colors or complementary colored products; and filtering the search results based on the textual search criteria.

8. The method of claim 1, further comprising the steps of:
   receiving a purchase request to purchase one or more products on the search results from the client device by the server over the communications network;
   processing the purchase request based on user's shipping and billing information stored in the database by a processor of the server or requesting shipping and billing information from the user via the client device by the processor of the server if the shipping and billing information is not available from the database;
   storing the products purchased by the user as a purchase record in the database by the processor of the server; and
   storing depersonalized purchase information in the database by the processor of the server.

9. The method of claim 1, further comprising the steps of adding a product on the search result to a user's wish list by a user module of the server, and storing the user's wish list in the database by the user module.

10. The method of claim 1, wherein the color-based search query from the client device comprises a digital image of the product; and further comprising the step of normalizing and codifying the digital image by an image processor of the server by:
   segmenting the digital image into a plurality of segments;
   analyzing each segment to determine a dominant color for each segment;
   determining at least one dominant color for the digital image based on prevalence of said at least one dominant color in said each segment;
   converting identified colors into the hexadecimal codes of the universal color system;
   searching for products having the hexadecimal code that is within the predetermined range of one or more of the hexadecimal codes of the digital image to provide the search result; and
   storing the identified colors, hexadecimal codes and the search result in the database.

11. The method of claim 1, further comprising the steps of:
   obtaining a digital image of a product by the client device associated with the user;
   normalizing and codifying the digital image by a processor of the client device by:
   segmenting the digital image into a plurality of segments;
   analyzing each segment to determine a dominant color for each segment;
   determining at least one dominant color for the digital image based on prevalence of said at least one dominant color in said each segment;
   converting identified colors into the hexadecimal codes of the universal color system;
   storing the identified colors and the hexadecimal codes in a memory of the client device; and
   transmitting the color-based search query comprising the hexadecimal codes associated with the digital image to the server over the communications network.

12. A system for searching and matching products based on color using a universal color system, comprising:
   a plurality of processor based client devices, each client device uniquely associated with a user;
   a database engine comprising a plurality of products from a plurality of merchants, each product being previously normalized and codified in accordance with hexadecimal color codes of the universal color system by extracting image data comprising a plurality of product images from a normalized data feed, segmenting each product image into a plurality of segments, analyzing each segment of said each product image to determine a dominant color for said each segment, determining at least one dominant product color for said each product image based on prevalence of said at least one dominant product color in said each segment, converting said at least one dominant product color for said each product image to a digital value of the universal color system based on color component intensity values, and assigning a hexadecimal color code of the universal color system that is closest to the digital value of said each product image;
   a processor based server connected to a communications system for receiving a color-based search query comprising user's color selection from a client device associated with a user over a communications network, the user's color selection comprising at least one hexadecimal color code of the universal color system;
   a color search engine of the server for searching the database engine for products having the hexadecimal color codes within a predetermined range of the hexadecimal color code of the user's color selection to provide a search result, and transmitting the search result to the client device associated with the user by the color search engine over the communications network; and
   a database for storing the user's color selection and the search result in a database, and updating color preference history of the user in the database.

13. The system of claim 12, wherein the color search engine searches at least one of the following: a data warehouse maintained by a service provider, inventory management systems of a plurality of merchants and supply chain management systems of a plurality of merchants.

14. The system of claim 13, wherein the color search engine filters the search result based on an availability of the products from the inventory management systems.

15. The system of claim 14, wherein the color search engine ranks the products on the search results based on their availability from merchants within the user's current geo-location.

16. The system of claim 14, wherein the color search engine searches the supply chain management systems for products available in a future date matching the user's color selection if no products are currently available from the inventory management system having the hexadecimal color code that is within the predetermined range of the hexadecimal color code of the user's color selection.

17. The system of claim 12, wherein the color search engine ranks the products on the search result based on their hexadecimal color codes, a product having the hexadecimal color code closer to the hexadecimal color code of the user's color selection being ranked higher than a product having the hexadecimal color code further from the hexadecimal color code of the user's color selection.

18. The system of claim 12, wherein the server receives textual search criteria from the client device over the communications network, the textual search criteria comprising at least one of the following: product description, product availability, size information, merchant information, product category, brand information, pattern information, complementary colors or complementary colored products; and filtering the search results based on the textual search criteria.

19. The system of claim 12, wherein the server receives a purchase request to purchase one or more products on the search results from the client device over the communications network; and wherein the server further comprises a processor for:
   processing the purchase request based on user's shipping and billing information stored in the database or requesting shipping and billing information from the user via the client device if the shipping and billing information is not available from the database;
   storing the products purchased by the user as a purchase record in the database; and
   storing depersonalized purchase information in the database.

20. The system of claim 12, wherein the server further comprises a user module for adding a product on the search result to a user's wish list and storing the user's wish list in the database.

21. The system of claim 12, wherein the color-based search query from the client device comprises a digital image of the product; and wherein the server further comprises an image processor for normalizing and codifying the digital image by:
   segmenting the digital image into a plurality of segments;

analyzing each segment to determine a dominant color for each segment;

determining at least one dominant color for the digital image based on prevalence of said at least one dominant color in said each segment;

converting identified colors into the hexadecimal codes of the universal color system;

searching for products having the hexadecimal code that is within the predetermined range of one or more of the hexadecimal codes of the digital image to provide the search result; and storing the identified colors, hexadecimal codes and the search result in the database.

22. The system of claim 12, wherein the client device associated with the user obtains a digital image of a product; and wherein the client device further comprises a processor for normalizing and codifying the digital image by:

segmenting the digital image into a plurality of segments;

analyzing each segment to determine a dominant color for each segment;

determining at least one dominant color for the digital image based on prevalence of said at least one dominant color in said each segment;

converting identified colors into the hexadecimal codes of the universal color system;

storing the identified colors and the hexadecimal codes in a memory of the client device; and transmitting the color-based search query comprising the hexadecimal codes associated with the digital image to the server over the communications network.

23. A non-transitory computer readable medium comprising computer executable code for searching and matching products based on color using a universal color system, the computer executable code comprising instructions for:

receiving a color-based search query comprising user's color selection from a processor based client device associated with a user by a processor based server over a communications network, the user's color selection comprising at least one hexadecimal color code of the universal color system;

searching a database engine by a color search engine of the server for products having the hexadecimal color codes within a predetermined range of the hexadecimal color code of the user's color selection to provide a search result, the database engine comprising a plurality of products from a plurality of merchants, each product being previously normalized and codified in accordance with the hexadecimal color codes of the universal color system by extracting image data comprising a plurality of product images from a normalized data feed, segmenting each product image into a plurality of segments, analyzing each segment of said each product image to determine a dominant color for said each segment, determining at least one dominant product color for said each product image based on prevalence of said at least one dominant product color in said each segment, converting said at least one dominant product color for said each product image to a digital value of the universal color system based on color component intensity values, and assigning a hexadecimal color code of the universal color system that is closest to the digital value of said each product image;

transmitting the search result to the client device associated with the user by the color search engine over the communications network;

storing the user's color selection and the search result in a database; and updating color preference history of the user in the database.

24. The non-transitory computer readable medium of claim 23, wherein said computer executable code further comprises instructions for searching at least one of the following by the color search engine: a data warehouse maintained by a service provider, inventory management systems of a plurality of merchants and supply chain management systems of a plurality of merchants.

25. The non-transitory computer readable medium of claim 24, wherein said computer executable code further comprises instructions for filtering the search result based on an availability of the products from the inventory management systems.

26. The non-transitory computer readable medium of claim 25, wherein said computer executable code further comprises instructions for ranking the products on the search results based on their availability from merchants within the user's current geo-location.

27. The non-transitory computer readable medium of claim 25, wherein said computer executable code further comprises instructions for searching the supply chain management systems for products available in a future date matching the user's color selection if no products are currently available from the inventory management systems having the hexadecimal color code that is within the predetermined range of the hexadecimal color code of the user's color selection.

28. The non-transitory computer readable medium of claim 23, wherein said computer executable code further comprises instructions for ranking the products on the search result based on their hexadecimal color codes, a product having the hexadecimal color code closer to the hexadecimal color code of the user's color selection being ranked higher than a product having the hexadecimal color code further from the hexadecimal color code of the user's color selection.

29. The non-transitory computer readable medium of claim 23, wherein said computer executable code further comprises instructions for receiving textual search criteria from the client device by the server over the communications network, the textual search criteria comprising at least one of the following: product description, product availability, size information, merchant information, product category, brand information, pattern information, complementary colors or complementary colored products; and filtering the search results based on the textual search criteria.

30. The non-transitory computer readable medium of claim 23, wherein said computer executable code further comprises instructions for:

receiving a purchase request to purchase one or more products on the search results from the client device by the server over the communications network;

processing the purchase request based on user's shipping and billing information stored in the database by a processor of the server or requesting shipping and billing information from the user via the client device by the processor of the server if the shipping and billing information is not available from the database;

storing the products purchased by the user as a purchase record in the database by the processor of the server; and storing depersonalized purchase information in the database by the processor of the server.

31. The non-transitory computer readable medium of claim 23, wherein said computer executable code further comprises instructions for adding a product on the search result to a user's wish list by a user module of the server, and storing the user's wish list in the database by the user module.

32. The non-transitory computer readable medium of claim 23, wherein the color-based search query from the client device comprises a digital image of the product; and wherein said computer executable code further comprises instructions for normalizing and codifying the digital image by an image processor of the server by:
- segmenting the digital image into a plurality of segments;
- analyzing each segment to determine a dominant color for each segment;
- determining at least one dominant color for the digital image based on prevalence of said at least one dominant color in said each segment;
- converting identified colors into the hexadecimal codes of the universal color system;
- searching for products having the hexadecimal code that is within the predetermined range of one or more of the hexadecimal codes of the digital image to provide the search result; and
- storing the identified colors, hexadecimal codes and the search result in the database.

33. The non-transitory computer readable medium of claim 23, wherein said computer executable code further comprises instructions for:
- obtaining a digital image of a product by the client device associated with the user;
- normalizing and codifying the digital image by a processor of the client device by:
- segmenting the digital image into a plurality of segments;
- analyzing each segment to determine a dominant color for each segment;
- determining at least one dominant color for the digital image based on prevalence of said at least one dominant color in said each segment;
- converting identified colors into the hexadecimal codes of the universal color system;
- storing the identified colors and the hexadecimal codes in a memory of the client device; and
- transmitting the color-based search query comprising the hexadecimal codes associated with the digital image to the server over the communications network.

* * * * *